(12) United States Patent
An et al.

(10) Patent No.: US 12,678,690 B2
(45) Date of Patent: Jul. 14, 2026

(54) DISPLAY METHOD AND RELATED APPARATUS

(71) Applicant: HUAWEI TECHNOLOGIES CO., LTD., Shenzhen (CN)

(72) Inventors: Wenji An, Shanghai (CN); Huanhuan Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 18/557,639

(22) PCT Filed: Mar. 28, 2022

(86) PCT No.: PCT/CN2022/083338
§ 371 (c)(1),
(2) Date: Oct. 27, 2023

(87) PCT Pub. No.: WO2022/227978
PCT Pub. Date: Nov. 3, 2022

(65) Prior Publication Data
US 2024/0367043 A1 Nov. 7, 2024

(30) Foreign Application Priority Data
Apr. 30, 2021 (CN) .......................... 202110481999.6

(51) Int. Cl.
*A63F 13/53* (2014.01)
*G06F 3/04817* (2022.01)
(52) U.S. Cl.
CPC .......... *A63F 13/53* (2014.09); *G06F 3/04817* (2013.01)

(58) Field of Classification Search
CPC ............................ A63F 13/53; G06F 3/04817
(Continued)

(56) References Cited

U.S. PATENT DOCUMENTS

2007/0252779 A1* 11/2007 Nishiyama .............. A63F 13/45
345/1.1
2020/0333994 A1* 10/2020 Sepulveda ............ G06F 3/0488
(Continued)

FOREIGN PATENT DOCUMENTS

CN 104978156 A 10/2015
CN 105828139 A 8/2016
(Continued)

OTHER PUBLICATIONS

Youtube Video "How To Put Your League of Legends Map on Your 2nd Monitor—Easy Tutorial—2015", dated Feb. 11, 2015. URL: https://www.youtube.com/watch?v=joY3DElAy7c (Year: 2015).*
(Continued)

*Primary Examiner* — Allen Chan
(74) *Attorney, Agent, or Firm* — Fish & Richardson P.C.

(57) ABSTRACT

This application provides a display method and a related apparatus. In an example method, a first electronic device runs a first application and displays a first user interface, where the first user interface comprises first content and second content, the second content overlaps with a part of the first content, and the first user interface is related to the first application. The first electronic device displays a second user interface in response to a first operation, where the second user interface comprises the first content, and the part that is of the first content and that is covered by the second content is presented on the second user interface.

20 Claims, 19 Drawing Sheets

(58) Field of Classification Search
USPC ........................................................... 463/31
See application file for complete search history.

(56) References Cited

U.S. PATENT DOCUMENTS

| | | | |
|---|---|---|---|
| 2020/0400456 A1* | 12/2020 | Sen .................... | G01C 21/3626 |
| 2021/0232300 A1* | 7/2021 | Hammons .............. | A63F 13/63 |

FOREIGN PATENT DOCUMENTS

| | | | |
|---|---|---|---|
| CN | 110221798 A | 9/2019 | |
| CN | 110928468 A | 3/2020 | |
| CN | 111314768 A | 6/2020 | |
| CN | 112286477 A | 1/2021 | |

OTHER PUBLICATIONS

Extended European Search Report in European Appln No. 22794451.
9, dated Sep. 23, 2024, 7 pages.

* cited by examiner

DISPLAY METHOD AND RELATED APPARATUS

CROSS-REFERENCE TO RELATED APPLICATIONS

This application is a National Stage of International Application No. PCT/CN2022/083338, filed on Mar. 28, 2022, which claims priority to Chinese Patent Application No. 202110481999.6, filed on Apr. 30, 2021, both of which are hereby incorporated by reference in their entireties.

TECHNICAL FIELD

This application relates to the field of terminal technologies, and in particular, to a display method and a related apparatus.

BACKGROUND

With development of electronic devices (such as a mobile phone, a tablet computer, and a notebook computer), electronic games are popular among increasingly more users. On game interfaces of many electronic games, a map may be displayed in a part of an area, so that a user can view a global situation of a game. However, an area for displaying the map may cover a part of an area for displaying a game scene. Consequently, a field of view of viewing the game scene by the user is blocked, affecting game experience of the user.

SUMMARY

This application provides a display method and a related apparatus. According to the method, first content and second content on a user interface in an application may be respectively displayed on two electronic devices, to implement projection in the application, and prevent the second content from blocking the first content on the user interface.

According to a first aspect, this application provides a display method. The method may be applied to a first electronic device. In the method, the first electronic device may run a first application, and display a first user interface. The first user interface may include first content and second content. The second content is displayed on a part of the first content. The first user interface is related to the first application. The first electronic device may display a second user interface in response to a first operation. The second user interface may include the first content, and the part that is of the first content and that is covered by the second content is presented on the second user interface. The first electronic device may send first data to a second electronic device. The first data enables the second electronic device to display a third user interface. The third user interface may include the second content. The first electronic device is communicatively connected to the second electronic device.

The second user interface may not include the second content. The first content may include content that is not displayed on the first user interface because the first content is blocked. After the first operation is performed, the first electronic device may transmit the first content to the second electronic device for display. In this case, the part that is of the first content and that is blocked by the second content may be displayed on the second user interface.

The third user interface may not include the first content. That the first user interface is related to the first application may indicate that the first content and the second content on the first user interface may be obtained by running the first application. The second electronic device displays the second content based on the first data. The second electronic device does not run the first application. To be specific, data (namely, the first data) that is of the second electronic device and that is used to draw the second content is provided by the first electronic device.

It can be learned from the method that the first electronic device may transmit a part of display content on the user interface in the application to the second electronic device for display, to implement projection in the application. According to the method, occurrence of a case in which the second content blocks the first content on the user interface can be reduced. Better user experience can be obtained when a user uses the application.

With reference to the first aspect, in some embodiments, the second user interface may further include third content, and the third content may be displayed on a part of the first content. The third content may have transparency. A size and a location of a display area of the third content may be respectively the same as a size and a location of a display area of the second content.

It can be learned from this embodiment that, after the first electronic device transmits the second content to the second electronic device for display, the third content may be used to identify that the display area of the third content is a display area displayed before the second content is projected. In addition, the third content has the transparency, and therefore does not completely block the part that is of the first content and that is originally blocked by the second content.

With reference to the first aspect, in some embodiments, the second user interface may include the first content but not include the second content. A specific method for displaying, by the first electronic device, the second user interface in response to the first operation may be: In response to the first operation, the first electronic device generates a second instruction stream and a third instruction stream based on a first instruction stream. The first instruction stream is related to the first application. The first electronic device may display the second user interface based on the second instruction stream.

The first electronic device may determine the first data based on the third instruction stream.

The first electronic device may store a target instruction library. The target instruction library may include the third instruction stream. A method for generating, by the first electronic device, the second instruction stream and the third instruction stream based on the first instruction stream may be: The first electronic device determines, from the first instruction stream, an instruction that matches an instruction in the target instruction library, and performs an interception operation. After performing the interception operation, the first electronic device may distinguish, from the first instruction stream, between the second instruction stream used to draw the first content and the third instruction stream used to draw the second content.

The target instruction library may be prestored by the first electronic device, or may be obtained from a cloud server.

It can be learned from this embodiment that, according to the display method, a developer of the first application does not need to perform an adaptive modification on the application. The first electronic device may project, onto another device, the part of display content on the user interface in the first application. In this case, the display method provided in this application is applicable to a plurality of types of applications such as a game application, a live broadcast application, or a video call application.

With reference to the first aspect, in some embodiments, in addition to the first content, the second user interface may further include third content. The third content is displayed on the part of the first content. The third content may have transparency. A specific method for displaying, by the first electronic device, the second user interface in response to the first operation may be: In response to the first operation, the first electronic device generates a second instruction stream and a third instruction stream based on a first instruction stream. The first instruction stream is related to the first application. The first electronic device may generate a fourth instruction stream based on the third instruction stream, and generate a fifth instruction stream based on the second instruction stream and the fourth instruction stream. The first electronic device may display, based on the fifth instruction stream, the user interface including the first content and the third content.

The first electronic device may determine the first data based on the third instruction stream.

Optionally, the fourth instruction stream may be included in the target instruction library. The fourth instruction stream may be used to draw the third content.

The first electronic device may obtain the fourth instruction stream from the target instruction library. Further, the first electronic device may generate the fifth instruction stream based on the second instruction stream and the fourth instruction stream.

With reference to the first aspect, in some embodiments, the first data may be the third instruction stream. Alternatively, the first data may be a first video stream. The first video stream may be obtained based on image data including the second content. The image data including the second content may be obtained based on the third instruction stream.

With reference to the first aspect, in some embodiments, the first electronic device may further receive a second operation performed on a first area of the second user interface, and execute an instruction in response to the second operation. The first area may be an area in which the part that is of the first content and that is covered by the second content is presented on the second user interface. Alternatively, the first area may be the display area of the third content.

To be specific, after the first electronic device transmits the second content to the second electronic device for display, a user operation that can be responded to by the first electronic device in the original display area of the second content is still valid. The original display area of the second content is the first area.

According to a second aspect, this application provides an electronic device. The electronic device is a first electronic device. The first electronic device may include a first application, a projection service invoking module, a projection module, an instruction interception module, a graphics processing unit GPU driver, a GPU, a display, and a storage module.

The first application may be run in the first electronic device. The first electronic device runs the first application, and invokes a three-dimensional graphics processing library to obtain a first instruction stream used to draw a first user interface. The first user interface may include first content and second content. The second content is displayed on a part of the first content. The first content may include content that is not displayed on the first user interface because the first content is blocked. The first instruction may be transmitted from the first application to the instruction interception module.

The projection service invoking module may be configured to: in response to the first operation, send, to the instruction interception module, an instruction for intercepting an instruction stream, and send, to the projection module, an instruction for enabling a projection function.

When receiving the instruction for intercepting the instruction stream, the instruction interception module may perform an interception operation on the first instruction stream by using a target instruction library, to obtain a second instruction stream and a third instruction stream. The target instruction library may include the third instruction stream. The second instruction stream may be transmitted from the instruction interception module to the GPU driver. The GPU driver may convert the second instruction stream into a program that can be executed by the GPU, and drive the GPU to execute the executable program obtained by converting the second instruction stream. The GPU may obtain image data of the first content. The image data of the first content may be transmitted to the display. The display may display a second user interface based on the image data of the first content. The second user interface may include first display content. Apart that is of the first content and that is covered by the second content is presented on the second user interface.

The projection module may be configured to send first data to a second electronic device. The first data may enable the second electronic device to display a third user interface. The third user interface includes the second content. The third user interface may not include the first content. The first data may be determined based on the third instruction stream.

The storage module may be configured to store a program installation package of the first application, the three-dimensional graphics processing library, and the target instruction library.

It can be learned that the first electronic device may transmit a part of display content on a user interface in an application to the second electronic device for display, to implement projection in the application. According to the method, occurrence of a case in which the second content blocks the first content on the user interface can be reduced. Better user experience can be obtained when a user uses the application.

With reference to the second aspect, in some embodiments, the instruction interception module may be further configured to generate a fourth instruction stream based on the third instruction stream, and generate a fifth instruction stream based on the second instruction stream and the fourth instruction stream. The fourth instruction stream may be used to draw third content. The fifth instruction stream may be transmitted from the instruction interception module to the GPU driver. The GPU driver may convert the fifth instruction stream into a program that can be executed by the GPU, and drive the GPU to execute the executable program obtained by converting the fifth instruction stream. The GPU may obtain image data including the first content and the third content. The image data of the first content and the third content may be transmitted to the display. The display may display, based on the image data of the first content and the third content, the second user interface including the first content and the third content. On the second user interface, the third content is displayed on the part of the first content. The third content has transparency. A size and a location of a display area of the third content are respectively the same as a size and a location of a display area of the second content.

It can be learned from this embodiment that, after the first electronic device transmits the second content to the second electronic device for display, the third content may be used to identify that the display area of the third content is a display area displayed before the second content is projected. In addition, the third content has the transparency, and therefore does not completely block the part that is of the first content and that is originally blocked by the second content.

With reference to the second aspect, in some embodiments, the first data may be the third instruction stream. To be specific, when the instruction interception module obtains the third instruction stream, the projection module may send the third instruction stream to the second electronic device. The second electronic device may display the second content on the display based on the third instruction stream.

With reference to the second aspect, in some embodiments, the first data may be a first video stream. The first electronic device may further include an image conversion module and a first storage module. The first storage module may be a storage area in the storage module. When the instruction interception module obtains the third instruction stream, the third instruction stream may be transmitted from the instruction interception module to the image conversion module. The image conversion module may transmit the third instruction stream to the GPU driver. The image conversion module may further transmit a storage path of the first storage module to the GPU driver. The GPU driver may convert the third instruction stream into a program that can be executed by the GPU, and drive the GPU to execute the executable program obtained by converting the third instruction stream. The GPU may obtain image data of the second content, and store the image data of the second content to the first storage module.

The image conversion module may be configured to convert the image data of the second content into the first video stream, and transmit the first video stream to the projection module. The projection module may send the first video stream to the second electronic device. The second electronic device may display the second content on the display based on the first video stream.

According to a third aspect, this application provides a display system. The display system may include a first electronic device and a second electronic device. The first electronic device is communicatively connected to the second electronic device. The first electronic device may be configured to run a first application, and display a first user interface. The first user interface includes first content and second content, the second content is displayed on a part of the first content, and the first user interface is related to the first application. The first electronic device may be further configured to display a second user interface in response to a first operation. The second user interface includes the first content, and the part that is of the first content and that is covered by the second content is presented on the second user interface. The first electronic device may be further configured to send first data to a second electronic device. The second electronic device may be configured to display a third user interface based on the first data. The third user interface includes the second content.

With reference to the third aspect, in some embodiments, the second user interface may further include third content, the third content is displayed on the part of the first content, and the third content has transparency. A size and a location of a display area of the third content are respectively the same as a size and a location of a display area of the second content.

With reference to the third aspect, in some embodiments, the second user interface may include the first content but not include the second content. The first electronic device may be configured to: in response to the first operation, generate a second instruction stream and a third instruction stream based on a first instruction stream, where the first instruction stream is related to the first application; display the second user interface based on the second instruction stream; and determine the first data based on the third instruction stream.

With reference to the third aspect, in some embodiments, the second user interface may include the first content and the third content. The first electronic device may be configured to: in response to the first operation, generate a second instruction stream and a third instruction stream based on a first instruction stream, where the first instruction stream is related to the first application; generate a fourth instruction stream based on the third instruction stream; generate a fifth instruction stream based on the second instruction stream and the fourth instruction stream: display the second user interface based on the fifth instruction stream, where the second user interface includes the first content and the third content; and determine the first data based on the third instruction stream.

With reference to the third aspect, in some embodiments, the first data may be the third instruction stream. Alternatively, the first data may be a first video stream, the first video stream is obtained based on image data including the second content, and the image data including the second content is obtained based on the third instruction stream.

With reference to the third aspect, in some embodiments, the first electronic device may be configured to receive a second operation performed on a first area of the second user interface, where the first area is an area in which the part that is of the first content and that is covered by the second content is presented on the second user interface, and execute an instruction in response to the second operation.

According to a fourth aspect, this application further provides an electronic device. The electronic device may include a display, a communication module, a memory, and a processor. The memory may be configured to store a computer program, and the processor may be configured to invoke the computer program, so that the electronic device performs the method in any one of the possible implementations of the first aspect.

According to a fifth aspect, this application provides a chip. The chip is applied to a device, and the chip includes one or more processors. The processors are configured to invoke computer instructions, so that the device performs the method in any one of the possible implementations of the first aspect.

According to a sixth aspect, this application provides a computer program product including instructions. When the computer program product runs on a device, the device is enabled to perform the method in any one of the possible implementations of the first aspect.

According to a seventh aspect, this application provides a computer-readable storage medium including instructions. When the instructions are run on a device, the device is enabled to perform the method in any one of the possible implementations of the first aspect.

It may be understood that the display system provided in the third aspect, the electronic device provided in the fourth aspect, the chip provided in the fifth aspect, the computer program product provided in the sixth aspect, and the computer-readable storage medium provided in the seventh aspect are all configured to perform the method provided in embodiments of this application. Therefore, for beneficial effects that can be achieved, refer to the beneficial effects in the corresponding method. Details are not described herein again.

DESCRIPTION OF EMBODIMENTS

The technical solutions according to embodiments of this application are clearly and completely described in the following with reference to accompanying drawings. In descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

Figure 1:
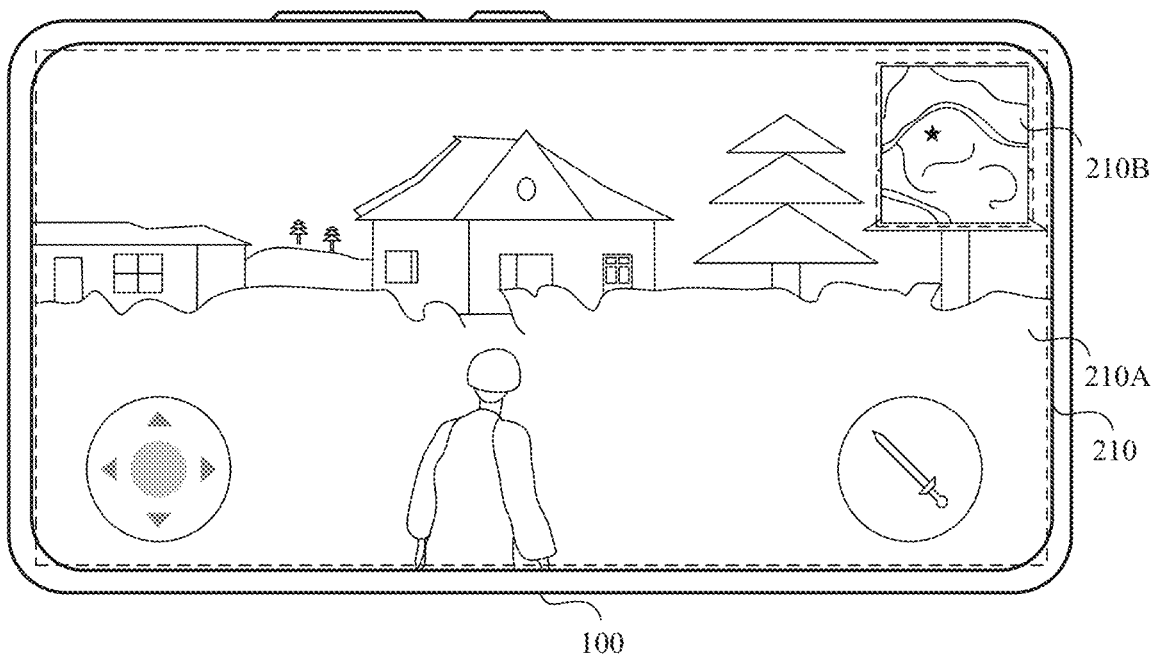
FIG. 1 is a schematic diagram of a game interface according to an embodiment of this application.

FIG. 1 is a schematic diagram of an example of a game interface of an electronic game.

As shown in FIG. 1, an electronic device 100 may run a game application, and display a game interface 210. The game interface 210 may include a game scene area 210A and a map area 210B.

Content displayed in the game scene area 210A may fill the game interface 210. The game scene area 210A may be used to display elements such as an environment, a building, a player character, a non-player character, an operation control for controlling the player character, and the like in the game.

The map area 210B may be used to display a map in the game. The map area 210B may include a location marker of a player character, location markers of some special places, and the like. Content displayed in the game scene area 210A and content displayed in the map area 210B are not limited in embodiments of this application.

It can be learned from FIG. 1 that the map area 210B may cover the game scene area 210A. In other words, the map area 210B blocks a part of content presented in the game scene area 210A. The blocked part in the game scene area 210A cannot be viewed by a user. Consequently, a field of view of the user for viewing a game scene is blocked. If the content presented in the game scene area 210A is not blocked by the map area 210B, game experience of the user is better.

Embodiments of this application provide a display method. According to the method, a part of display content on a user interface of an electronic device 100 may be projected onto an electronic device 200. The electronic device 200 may display the projected part of display content. Specifically, the electronic device 100 may run Application A, and display a user interface A of the Application A. The user interface A may include first display content and second display content. The electronic device 10 may intercept, based on a target instruction library, a graphics instruction stream of the first display content from a graphics instruction stream of the user interface A. The electronic device 200 may display the first display content based on the graphics instruction stream of the first display content. After intercepting the graphics instruction stream, the electronic device 100 may display, based on another part of the graphics instruction stream (for example, a graphics instruction stream of the second display content) in the graphics instruction stream of the user interface A, content other than the first display content on the user interface A.

Both the first display content and the second display content may be independently displayed. In a possible implementation, a render thread used by the electronic device 100 to render the first display content on the user interface A is different from a render thread used to render the second display content. The electronic device 100 may concurrently execute the render thread for rendering the first display content and the render thread for rendering the second display content, to simultaneously display the first display content and the second display content on the user interface. A thread may indicate a single sequential flow of control in a process. The process is a program that has been run in the electronic device. There may be a plurality of concurrent threads in one process, and the threads perform different tasks concurrently. Different render threads may perform tasks for rendering different content (for example, rendering the first display content and rendering the second display content).

In some embodiments, the first display content may cover the second display content, and partially block the second display content. The graphics instruction stream of the user interface A may include a graphics instruction stream used to draw content that is in the second display content and that is blocked by the first display content. If the electronic device 100 removes the first display content from the user interface A, the user interface A may display the content that is in the second display content and that is blocked by the first display content.

The target instruction library may include a drawing instruction (for example, a function used to draw a graph and a parameter in the function) for drawing the first display content. The target instruction library may be prestored by the electronic device 100, or may be obtained from a cloud server. A method for obtaining the target instruction library by the electronic device 100 is not limited in embodiments of this application.

In other words, the first display content may be content drawn based on the drawing instruction in the target instruction library.

A specific method for intercepting, by the electronic device 100 based on the target instruction library, the graphics instruction stream of the first display content from the graphics instruction stream of the user interface A may be: The electronic device 100 determines, from the graphics instruction stream of the user interface A, an instruction that matches an instruction in the target instruction library, and performs an interception operation, to obtain the graphics instruction stream of the first display content.

The graphics instruction stream of the user interface may include one or more instructions used to draw the user interface.

It can be learned from the display method that the electronic device 100 may transmit a part of display content on a user interface in an application to the electronic device 200 for display, to implement projection in the application. According to the display method, occurrence of a case in which the first display content blocks the second display content on the user interface can be reduced. Better user experience can be obtained when a user uses the application.

The application may be a game application, a live broadcast application, a video call application, or the like. A type of the application in the projection process is not limited in embodiments of this application.

In subsequent embodiments of this application, the display method provided in embodiments of this application is specifically described by using a game application as an example. The content displayed in the game scene area 210A shown in FIG. 1 is the second display content. The content displayed in the map area 210B shown in FIG. 1 is the first display content. A graphics instruction stream of the game interface 210 may include a map instruction stream and a game scene instruction stream. The graphics instruction stream used to draw the game interface 210 may be obtained from a game engine. The map instruction stream includes an instruction used to draw the content displayed in the map area 210B. The game scene instruction stream includes an instruction used to draw the content displayed in the game scene area 210A. An image drawn based on the game scene instruction stream may include content that is in the game scene area 210A and that is blocked by the map area 210B.

In a possible implementation, the electronic device 100 may intercept, based on the target instruction library, the map instruction stream from the graphics instruction stream of the game interface 210. After intercepting the map instruction stream, the electronic device 100 may perform rendering based on the map instruction stream, to obtain an image of the map area 210B. Further, the electronic device 100 may encode the image of the map area 210B as a video stream, and send the video stream to the electronic device 200. The electronic device 200 may display the video stream. In other words, the content presented in the map area 210B may be displayed on the electronic device 200. In addition, the electronic device 100 may locally display the content in the game scene area 210A based on an instruction stream, for example, the game scene instruction stream, remained after an instruction stream interception operation. In this way, the electronic device 100 may display the content in the game scene area 210A. The electronic device 200 may display the content in the map area 210B. The map area 210B no longer blocks the content in the game scene area 210A. Therefore, the user can obtain a larger field of view during game playing.

In another possible implementation, the electronic device 100 may intercept, based on the target instruction library, the map instruction stream from the graphics instruction stream of the game interface 210, and send the map instruction stream to the electronic device 200. The electronic device 200 may execute the instruction included in the map instruction stream, to display the content in the map area 210B. In addition, the electronic device 100 may locally display the content in the game scene area 210A based on an instruction stream, for example, the game scene instruction stream, remained after an instruction stream interception operation. In this way, the electronic device 100 may display the content in the game scene area 210A. The electronic device 200 may display the content in the map area 210B. The map area 210B no longer blocks the content in the game scene area 210A. Therefore, the user can obtain a larger field of view during game playing.

In some embodiments, Application A may be installed in the electronic device 100. The Application A may be, for example, an application assistant application or a game assistant application. Auxiliary services that can be provided by the Application A for an application associated with the Application A include but are not limited to: Do not disturb, Screenshot, Screen recorder, and Game acceleration.

The electronic device 100 may associate the Application A with the game application. The electronic device 100 may obtain the target instruction library by using the Application A. In response to a user operation of projecting the content in the map area 210B onto the electronic device 200, the electronic device 100 may transmit, based on the target instruction library and by using the display method provided in embodiments of this application, the content in the map area 210B to the electronic device 200 for display. A process in which the electronic device 100 associates the Application A with the game application is described in a subsequent embodiment. Details are not described herein.

It can be learned that the electronic device 100 may implement the display method by using the Application A. That is, an application that requires projection does not need to be modified. In this way, when a developer of a third-party application does not adaptively modify the application, the electronic device 100 may project, onto another device, a part of display content on a user interface of the third-party application. In this case, the display method provided in this application is applicable to a plurality of types of applications such as a game application, a live broadcast application, or a video call application.

The electronic device 100 may be a device with a display, for example, a mobile phone, a tablet computer, a notebook computer, an ultra-mobile personal computer (ultra-mobile personal computer, UMPC), a netbook, or a personal digital assistant (personal digital assistant, PDA). A specific type of the electronic device 100 is not limited in embodiments of this application.

Figure 2:
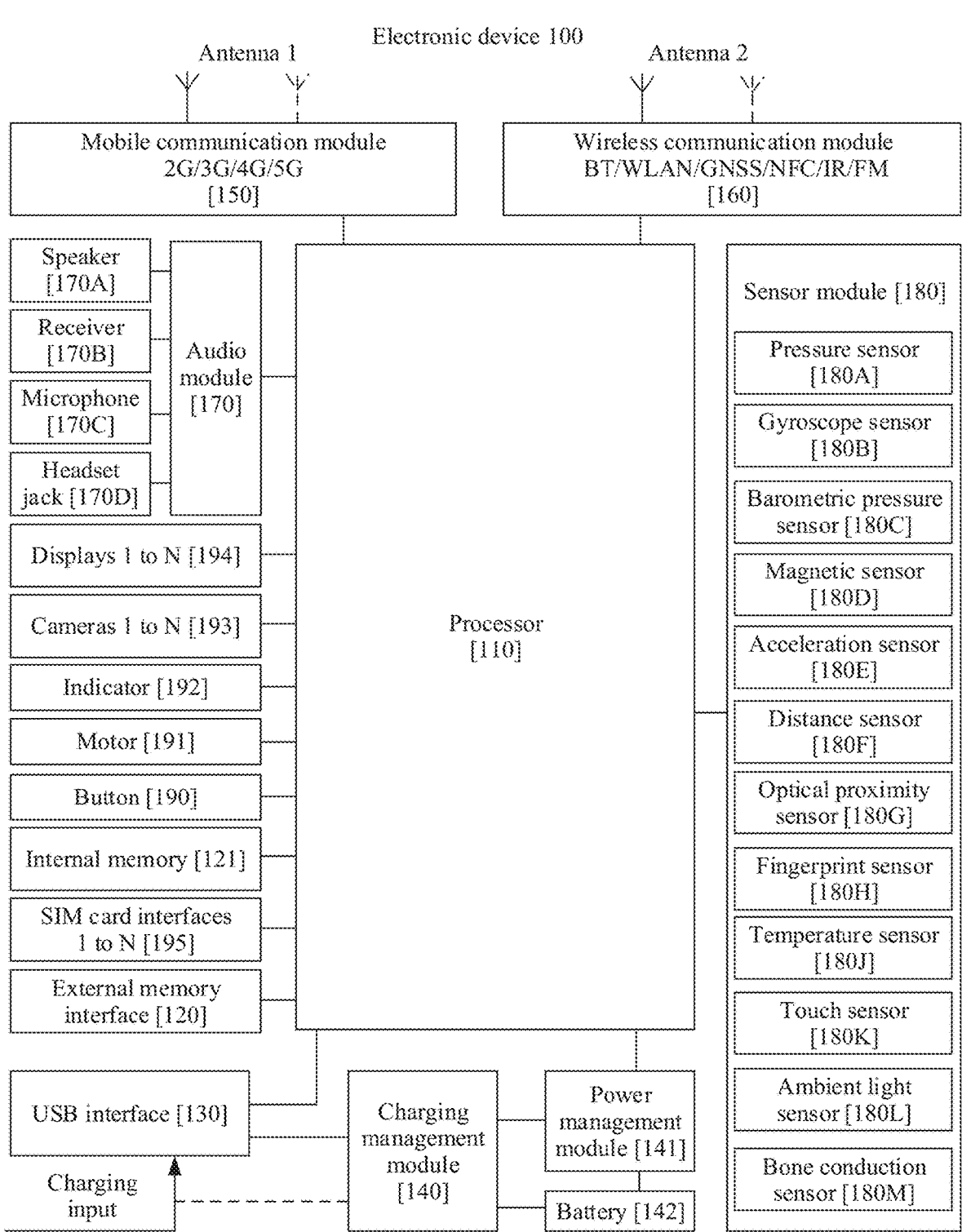
FIG. 2 is a schematic diagram of a structure of an electronic device 100 according to an embodiment of this application.

FIG. 2 is a Schematic Diagram of an Example Structure of an Electronic Device 100 According to an Embodiment of this Application.

As shown in FIG. 2, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, to improve system efficiency.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to perform data transmission between the electronic device 100 and a peripheral device, or may be configured to connect to a headset for playing an audio through the headset. The interface may be further configured to connect to other electronic devices such as an AR device.

The charging management module 140 is configured to receive a charging input from a charger. The charger may be a wireless charger or a wired charger. When charging the battery 142, the charging management module 140 may further supply power to the electronic device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communication module 160, and the like.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization.

The mobile communication module 150 can provide a solution, applied to the electronic device 100, to wireless communication including 2G/3G/4G/5G, or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same component as at least some modules in the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a solution, applied to the electronic device 100, to wireless communication including a wireless local area network (wireless local area networks. WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode. QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor The NPU quickly processes input information by referring to a structure of a biological neural network, for example, by referring to a mode of transfer between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (for example, audio data or an address book) created during use of the electronic device 100, and the like. In addition, the internal memory 121 may include a high-speed random access memory, and may further include a non-volatile memory, for example, at least one magnetic disk storage device, a flash memory, or a universal flash storage (universal flash storage, UFS).

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for an output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be configured to listen to music or answer a call in a hands-free mode through the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through a mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is executed. When a touch operation whose touch operation intensity is greater than or equal to the first pressure threshold is performed on the Messages application icon, an instruction for creating a new SMS message is executed.

The gyroscope sensor 180B may be configured to determine a motion posture of the electronic device 100.

The barometric pressure sensor 180C is configured to measure barometric pressure.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover based on the magnetic sensor 180D. Further, a feature like automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in switching between a landscape mode and a portrait mode, a pedometer, or the like.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED), and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transmit the detected touch operation to the application processor to determine a type of a touch event. A visual output related to the touch operation may be provided through the display 194. In some other embodiments, the touch sensor 180K may alternatively be disposed on a surface of the electronic device 100 at a location different from that of the display 194.

The bone conduction sensor 180M may obtain a vibration signal.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is also compatible with different types of SIM cards. The SIM card interface 195 is also compatible with an external storage card. The electronic device 100 interacts with a network through the SIM card, to implement functions such as a call and data communication. In some embodiments, the electronic device 100 uses an eSIM, namely, an embedded SIM card. The eSIM card may be embedded into the electronic device 100, and cannot be separated from the electronic device 100.

The electronic device 200 may be a device with a display, for example, a mobile phone, a tablet computer, a notebook computer, a television, a smart screen, an ultra-mobile personal computer (ultra-mobile personal computer, UMPC), a netbook, or a personal digital assistant (personal digital assistant, PDA). A specific type of the electronic device 200 is not limited in embodiments of this application.

For a schematic diagram of a structure of the electronic device 200, refer to the schematic diagram of the structure of the electronic device 100 shown in FIG. 2. Details are not described herein again.

Figure 3:
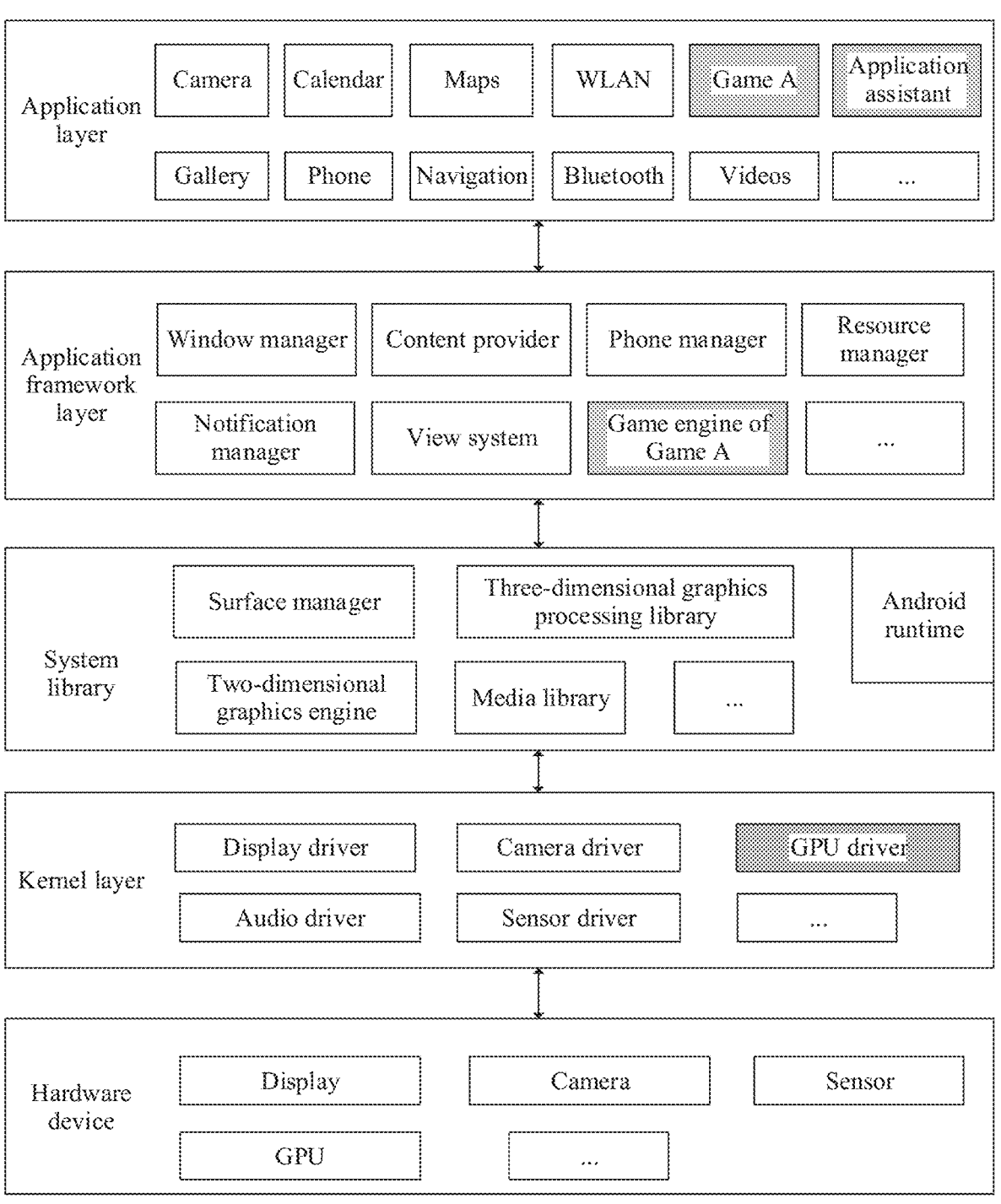
FIG. 3 is a schematic diagram of a structure of another electronic device 100 according to an embodiment of this application.

A software system of the electronic device 100 may use a layered architecture, an event-driven architecture, a micro-kernel architecture, a micro service architecture, or a cloud architecture. In embodiments of this application, an Android system with a layered architecture is used as an example to describe a software structure of the electronic device 100. FIG. 3 is a Schematic Diagram of an Example of Another Structure of the Electronic Device 100 According to an Embodiment of this Application.

The electronic device 100 may have the software structure and the hardware device that are shown in FIG. 3. In the layered architecture, software is divided into several layers, and each layer has a clear role and task. The layers communicate with each other through a software interface. In some embodiments, the Android system may be divided into four layers: an application layer, an application framework layer, an Android runtime (Android runtime) and system library, and a kernel layer from top to bottom.

The application layer may include a series of application packages.

As shown in FIG. 3, the application packages may include applications such as Camera, Gallery, Calendar, Phone, Maps, Navigation, WLAN, Bluetooth, Videos, Game A. and Application A.

When running the Game A application, the electronic device 100 may display the user interface shown in FIG. 1.

The Application A may provide a corresponding auxiliary service for another application (for example, the Game A application). For example, in a running process of an application associated with the Application A, a user may quickly enable services such as Do not disturb, Game acceleration, and Map projection by using the Application A.

The application framework layer provides an application programming interface (application programming interface, API) and a programming framework for an application at the application layer. The application framework layer includes some predefined functions.

As shown in FIG. 3, the application framework layer may include a window manager, a content provider, a phone manager, a resource manager, a notification manager, a view system, a game engine of the Game A. and the like.

The window manager may be used to manage a window program. The window manager may obtain a size of a display, determine whether there is a status bar, perform screen locking, take a screenshot, and the like.

The content provider may be used to store and obtain data, and enable the data to be accessed by an application. The data may include a video, an image, an audio, calls that are made and answered, a browsing history and bookmarks, an address book, and the like.

The view system may include visual controls such as a control for displaying a text and a control for displaying a picture. The view system may be used to construct an application. A display interface may include one or more views. For example, a display interface including an SMS message notification icon may include a view for displaying a text and a view for displaying a picture.

The phone manager may be used to provide a communication function of the electronic device 100, for example, management of a call status (including answering, declining, or the like).

The resource manager may provide various resources such as a localized character string, an icon, a picture, a layout file, and a video file for an application.

The notification manager enables an application to display notification information in a status bar, and may be configured to convey a notification message that may automatically disappear after a short pause without requiring user interaction. For example, the notification manager is used to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The game engine of the Game A may be used to implement rendering on a user interface of the Game A application. The game engine of the Game A may obtain a parameter used to draw the user interface of the Game A application, and invoke a three-dimensional graphics processing library in the system library to implement rendering on the user interface. The game engine of the game A may be further used to process communication between a player and the electronic device 100, for example, a signal from a component like a display, a keyboard, or a mouse. To be specific, when a user performs an operation on the Game A application, the game engine of the game A may execute a related instruction, so that the electronic device 100 may provide feedback corresponding to the user operation.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes java files at the application layer and the application framework layer as binary files. The virtual machine is used to implement functions such as object lifecycle management, stack management, thread management, security and exception management, and garbage collection.

The system library may include a plurality of functional modules, for example, a surface manager (surface manager), a media library (Media Library), a three-dimensional (3 dimensional, 3D) graphics processing library, a two-dimensional (2 dimensional, 2D) graphics engine, and the like.

The surface manager may be used to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, H.265, MP3, AMR, JPG, and PNG.

The 3D graphics processing library is configured to implement three-dimensional graphics drawing, image rendering, composition, layer processing, and the like. The 3D graphics processing library may include OpenGL, OpenGL ES, OpenCV, Vulkan, and the like.

The 2D graphics engine is a drawing engine for 2D drawing. The 2D graphics engine may be, for example, SGL.

The kernel layer is a layer between the hardware device and software. The kernel layer includes at least a display driver, a camera driver, a GPU driver, an audio driver, and a sensor driver. The electronic device 100 may drive the hardware device by using the kernel layer to implement a corresponding function. For example, the GPU driver may include an instruction that is executed by a central processing unit (central processing unit, CPU) and that enables the GPU to work. To be specific, the CPU may execute the instruction in the GPU driver, so that the GPU performs mathematical and geometric calculation. Further, the display may display an image based on a calculation result of the GPU.

The hardware device of the electronic device 100 may include the display, a camera, a sensor, and the like. For details about the hardware device of the electronic device 100, refer to the descriptions of FIG. 2.

The following describes an example of a working process of software and the hardware device of the electronic device 100 with reference to a scenario in which a game interface of a Game A application is displayed on the display.

When the touch sensor 180K receives a touch operation, a corresponding hardware terminal is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of a Game A application icon. The Game A application may invoke an interface at the application framework layer, for example, the game engine of the Game A. The game engine of the Game A may obtain parameters used to draw the game interface of the Game A application, and invoke the three-dimensional graphics processing library (for example, OpenGL ES) in the system library, to obtain a graphics instruction stream used to draw the game interface. OpenGL ES is an application computer graphics program interface (application programming interface, API). The OpenGL ES includes a plurality of types of functions/application programming interfaces. That the game engine of Game A invokes the OpenGL ES may specifically indicate that the game engine of Game A assigns a value to parameters in an instruction. The parameters in the instruction may be parameters used to draw the game interface, for example, a size of the map area 210B shown in FIG. 1, a size of a building, a size of a player character, and the like. Values of these parameters may be obtained by the game engine from a local Game A application package or from a game server.

Further, the electronic device 100 may transmit, to the GPU driver, the graphics instruction stream used to draw the game interface. The GPU driver may convert the instruction in the graphics instruction stream into an underlying program, and drive the GPU to execute the underlying program. The underlying program is a program (for example, machine code) that can be executed by the GPU. The GPU executes the underlying program to obtain image data of the game interface. The GPU may be connected to the display, and transmit the image data of the game interface to the display. The display may display the game interface of the Game A application.

Figure 4:
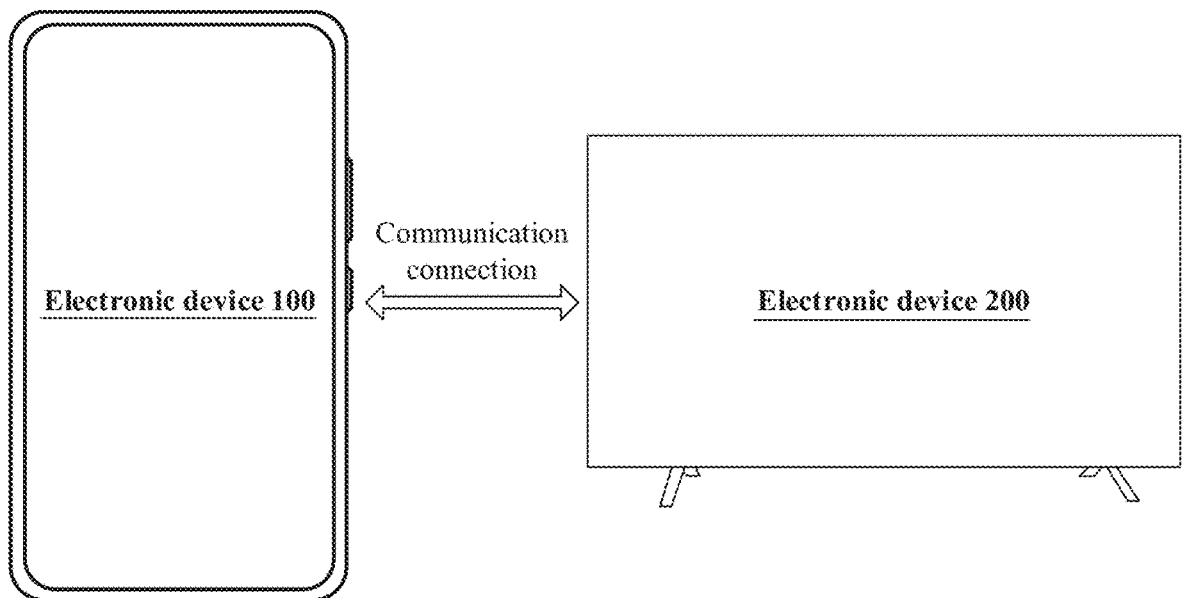
FIG. 4 is a schematic diagram of a projection system according to an embodiment of this application.

FIG. 4 Shows an Example of a Projection System According to an Embodiment of this Application.

As shown in FIG. 4, the projection system may include an electronic device 100 and an electronic device 200. For structures of the electronic device 100 and the electronic device 200, refer to the descriptions in the foregoing embodiments. A communication connection is established between the electronic device 100 and the electronic device 200. The electronic device 100 may send, to the electronic device 200 through the communication connection, content that needs to be projected. For example, the electronic device 100 and the electronic device 200 may be in a same local area network (for example, same home Wi-Fi). In response to a user operation used for projection, the electronic device 100 may search for an electronic device that is in the same local area network as the electronic device 100. When receiving an instruction instructing that the electronic device 200 is a projection device, the electronic device 100 may establish the communication connection to the electronic device 200. The electronic device 20 may display the content that needs to be projected from the electronic device 100. A method for establishing the communication connection between the electronic device 100 and the electronic device 200 is not limited in this embodiment of this application.

When the content that needs to be projected is sent, a projection protocol (such as Miracast, DLNA, or AirPlay) in the conventional technology may be used between the electronic device 100 and the electronic device 200. Alternatively, a protocol used for transmitting the content that needs to be projected may be a proprietary protocol agreed on between the electronic device 100 and the electronic device 200. A projection protocol used for transmitting data between the electronic device 100 and the electronic device 200 is not limited in this embodiment of this application.

The Following Describes a Process of Associating a Game Application with Application a by Using the Game Application as an Example.

FIG. 5A to FIG. 5D are schematic diagrams of an example scenario in which the game application is associated with the Application A.

Figure 5A:
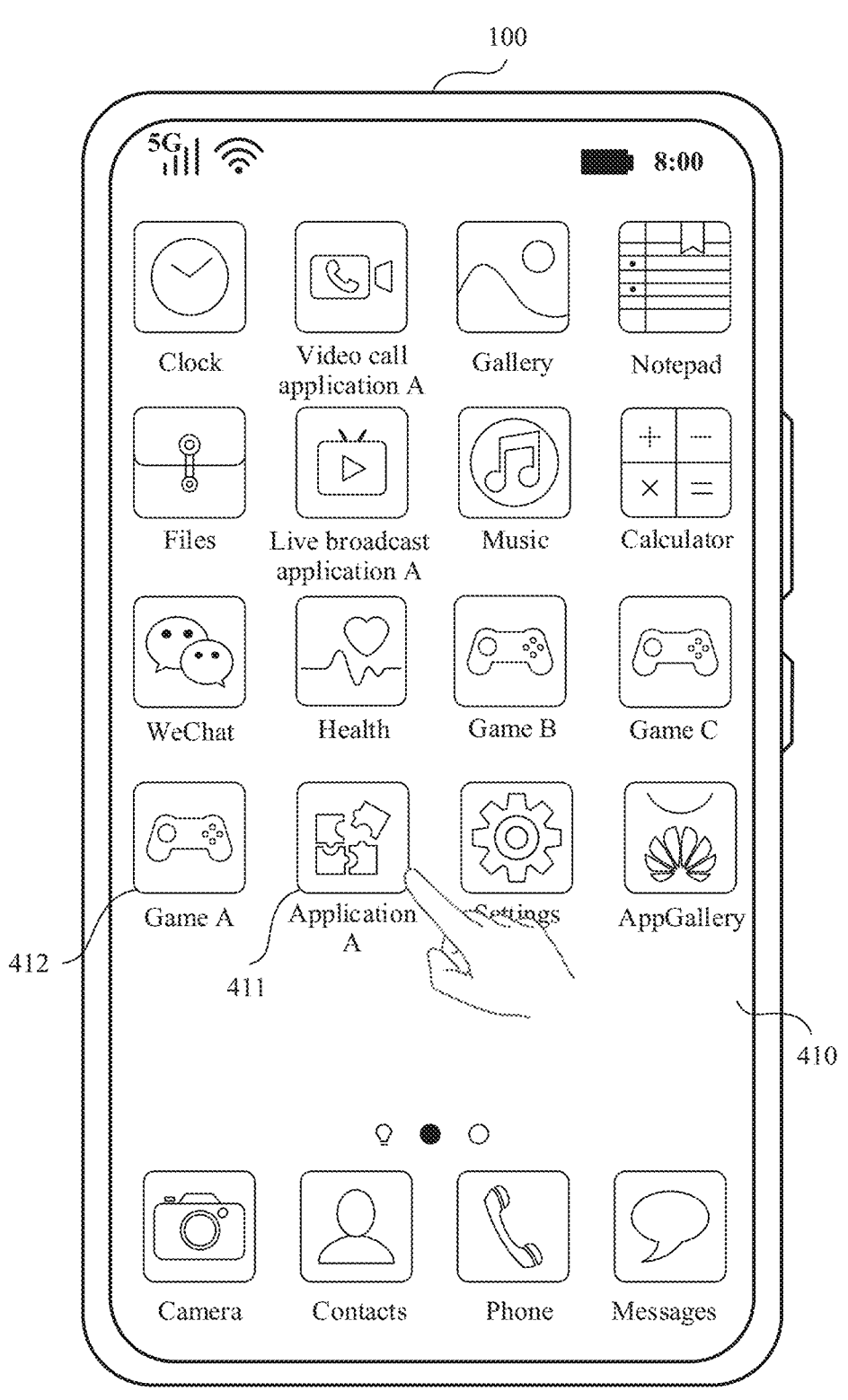
FIG. 5A to FIG. 5D are schematic diagrams of a scenario in which a game application is associated with Application A according to an embodiment of this application.

As shown in FIG. 5A, the electronic device 100 may display a user interface 410. The user interface 410 displays a page on which an application icon is placed. The page may include a plurality of application icons (for example, a Video call application A icon, a Live broadcast application A icon, a WeChat application Icon®, a Health application icon, a Game B application icon, a Game C application icon, a Game A application icon 412, and an Application A icon 411). A page indicator is further displayed below the plurality of application icons, to indicate a location relationship between the currently displayed page and another page. There are a plurality of tray icons (for example, a Camera application icon, a Contacts application icon, a Phone application icon, and a Messages application icon) below the page indicator. The tray icons remain displayed when the page is switched. Content displayed on the user interface 410 is not limited in this embodiment of this application.

Figure 5B:
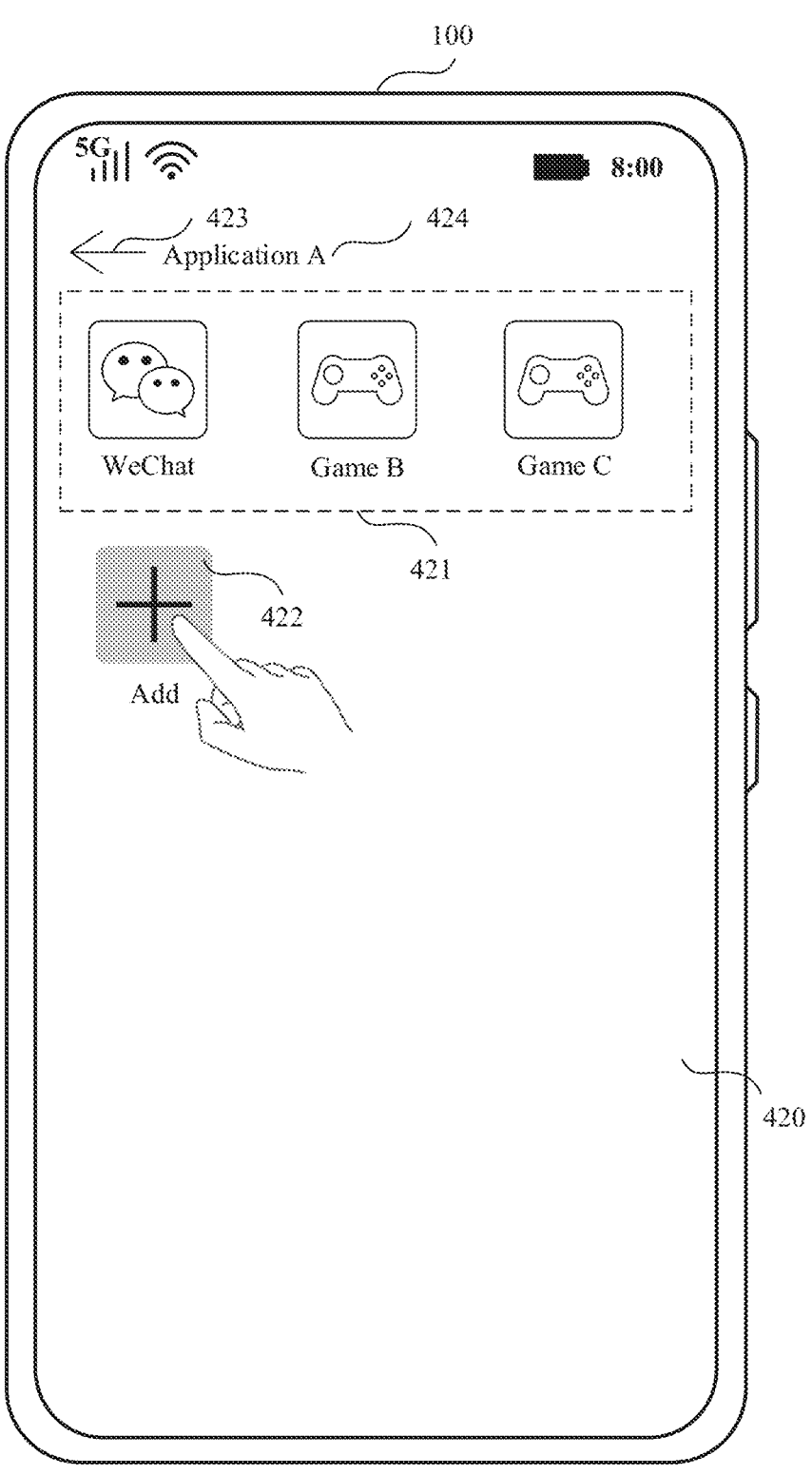

In response to a user operation performed on the Application A icon 411, the electronic device 100 may start the Application A. and display a user interface 420 shown in FIG. 5B. The user interface 420 may include an associated application display area 421, an Add control 422, a return control 423, and a title bar 424.

The return control 423 may be configured to indicate the electronic device 100 to return to a previous user interface of the user interface 420. For example, in response to a user operation performed on the return control 423, the electronic device 100 may exit the Application A, and display the user interface 410 shown in FIG. 5A.

The title bar 424 may be used to indicate content displayed on the user interface 420. A presentation form of the title bar 424 may be text information "Application A", an icon, or another form.

The associated application display area 421 includes one or more application icons associated with the Application A, for example, the WeChat application icon, the Game B application icon, and the Game C application icon. The applications that are associated with the Application A are applications that are installed in the electronic device 100. When an application is associated with the Application A, in a running process of the application, the Application A icon may be displayed on a user interface of the application in a floating manner, or displayed in a side application bar that can be invoked and hidden. In this way, when using the application, a user can quickly invoke an auxiliary service that can be provided by the Application A. A display form of the Application A icon is not limited to a floating icon and the side application bar. The electronic device 100 may alternatively provide, for the user in another form, an entry for invoking the auxiliary service that can be provided by the Application A.

The auxiliary service may include but is not limited to the following services: Do not disturb, Screenshot. Screen recorder, Game acceleration, and Map projection.

The Do not disturb service may be used to prevent a notification of another application (such as a WeChat application, a Messages application, or a Phone application) from being displayed on the user interface of the application during running of the application for invoking this service. In a possible implementation, when the Do not disturb service is invoked, the electronic device 100 may manage a notification of each application by using a notification manager, so that the notification of each application is not displayed on the user interface.

The Screenshot service may be used to capture, during running of the application for invoking this service, a screenshot for the user interface of the application and save the screenshot as a picture.

The Screen recorder service may be used to save, as a video, a plurality of frames of images obtained from screen recording start to screen recording end during running of the application for invoking this service.

The Game acceleration service may be an auxiliary service provided by the Application A for the game application. When the game application invokes the Game acceleration service, the electronic device 100 may use a performance-oriented system parameter during running of the game application. For example, more computing resources and storage resources are allocated to the game application, and WLAN and mobile data are used for network acceleration. In this way, game performance is improved.

The Map projection service may also be an auxiliary service provided by the Application A for the game application. In some embodiments, the electronic device 100 in which the Application A is installed stores a target instruction library corresponding to the game application. The target instruction library may include an instruction and a parameter that are used to draw a map in the game application. In some other embodiments, when the Application A is associated with the game application, the electronic device 100 may obtain, from a cloud server, a target instruction library corresponding to the game application. When the game application invokes the Map projection service, the electronic device 100 may transmit, by using the display method provided in embodiments of this application, the map in the game application to the electronic device 200 for display.

The service is not limited to the Map projection service provided for the game application. The Application A may further provide an in-application projection service for another type of an application (for example, a live broadcast application or a video call application) by using the display method provided in embodiments of this application. For example, in a running process of the video call application, a user interface may include a local image display area and a peer image display area. A local party and a peer party are two parties in a video call. The peer image display area may be displayed on the user interface in a form of a small floating window, and cover the local image display area. When the video call application invokes the in-application projection service, the electronic device 100 may transmit, by using the display method provided in embodiments of this application, content in the peer image display area in the video call application to the electronic device 200 for display. The content in the peer image display area is obtained based on a video stream collected by a camera of a video call device of the peer party. In the projection process, the electronic device 100 may further send, to the electronic device 200, the received video stream transmitted by the video call device of the peer party.

The Add control 422 may be configured to add an application associated with the Application A. In response to a user operation performed on the Add control 422, the electronic device 100 may display a user interface 430 shown in FIG. 5C.

Figure 5C:
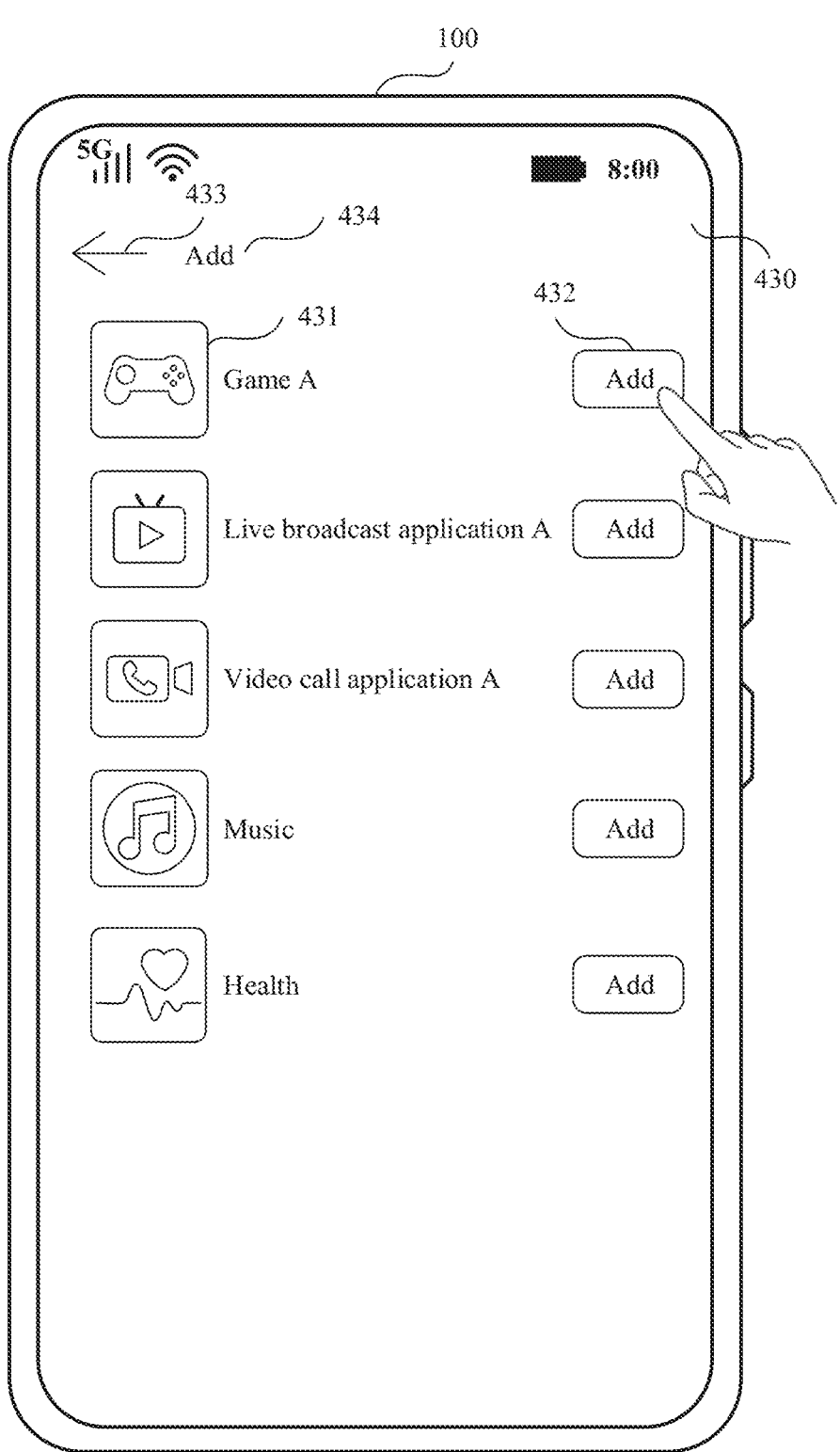

As shown in FIG. 5C, the user interface 430 may include a return control 433, a title bar 434, a Game A application icon 431, and an associated control 432.

The return control 433 may be configured to indicate the electronic device 100 to return to a previous user interface of the user interface 430. For example, in response to a user operation performed on the return control 433, the electronic device 100 may display the user interface 420 shown in FIG. 5B.

The title bar 434 may be used to indicate that the user interface is an interface on which the electronic device 100 associates the Application A with another application. A presentation form of the title bar 434 may be text information "Add", an icon, or another form.

The associated control 432 may be configured to associate the Game A application with the Application A. In response to a user operation performed on the associated control 432, the electronic device 100 may associate the Game A application with the Application A.

Figure 5D:
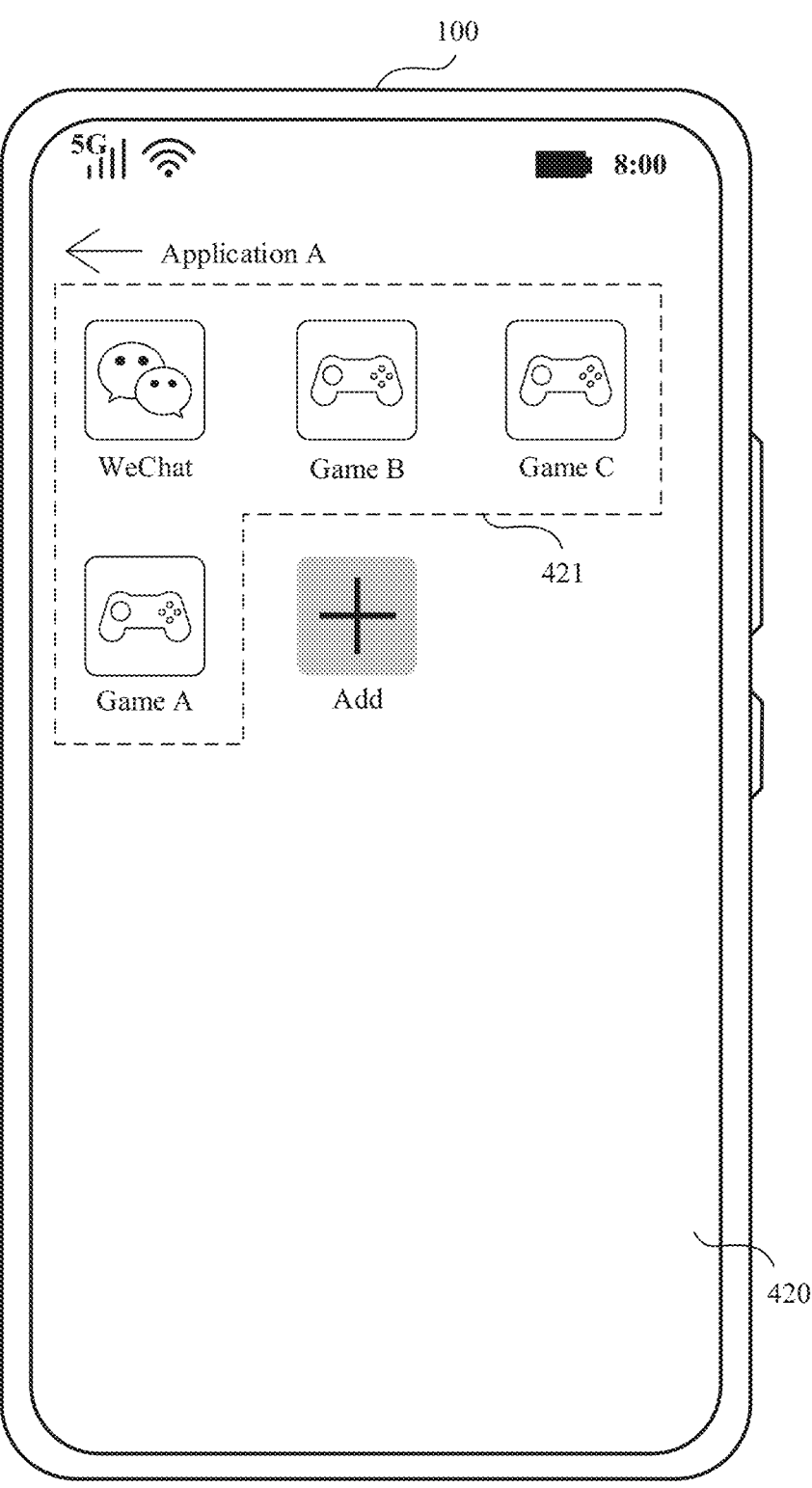

Compared with the associated application display area 421 shown in FIG. 5B, an associated application display area 421 in the user interface 420 shown in FIG. 5D includes the Game A application icon. In other words, the Game A application is associated with the Application A.

The user interface 430 may further include more application icons that may be associated with the Application A and associated controls corresponding to these applications, for example, the Live broadcast application A icon, the Video call application A icon, a Music application icon, and a Health application icon. Applications corresponding to these application icons are all applications that are installed in the electronic device 100.

The user interfaces shown in FIG. 5A to FIG. 5D are merely examples for description, and shall not constitute a limitation on this application.

In some embodiments, the electronic device 100 may automatically associate an application of a specific type with the Application A. The application of the specific type may be, for example, a type of an application like a game application, a live broadcast application, or a video call application. Specifically, the electronic device 100 may obtain a type of an application installed in the electronic device 10x). For example, an application installation package includes an identifier of the type of the application. The electronic device 100 may select, based on the identifier of the type of the application, the application of the specific type from the applications installed in the electronic device 100, and automatically associate the application of the specific type with the Application A. A method for obtaining the type of the application by the electronic device is not limited in embodiments of this application.

In other words, the user may not perform operations that are of manually associating the Application A with another application and that are shown in FIG. 5A to FIG. 5D. When the application of the specific type is installed in the electronic device 100, the electronic device 100 may automatically associate the installed application of the specific type with the Application A.

Based on the scenario that the Game A application is associated with the Application A shown in FIG. 5A to FIG. 5D, the following describes the display method provided in embodiments of this application with reference to an example in which a map in the Game A application is projected.

FIG. 6A to FIG. 6F are schematic diagrams of an example scenario in which the electronic device 100 projects the map in the Game A application onto the electronic device 200.

Figure 6A:
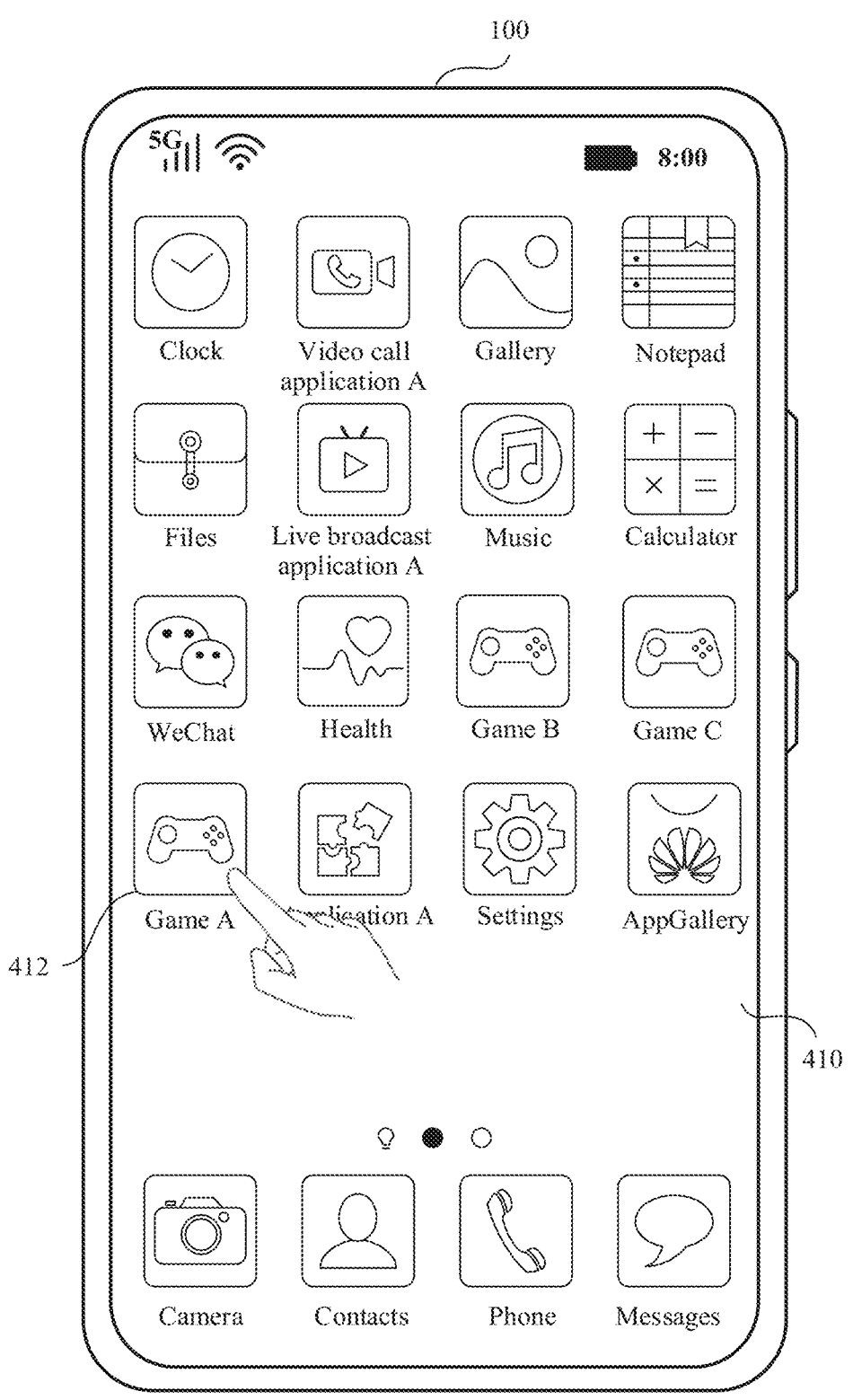
FIG. 6A to FIG. 6F are schematic diagrams of a projection scenario of an electronic device 100 according to an embodiment of this application.
Figure 6B:
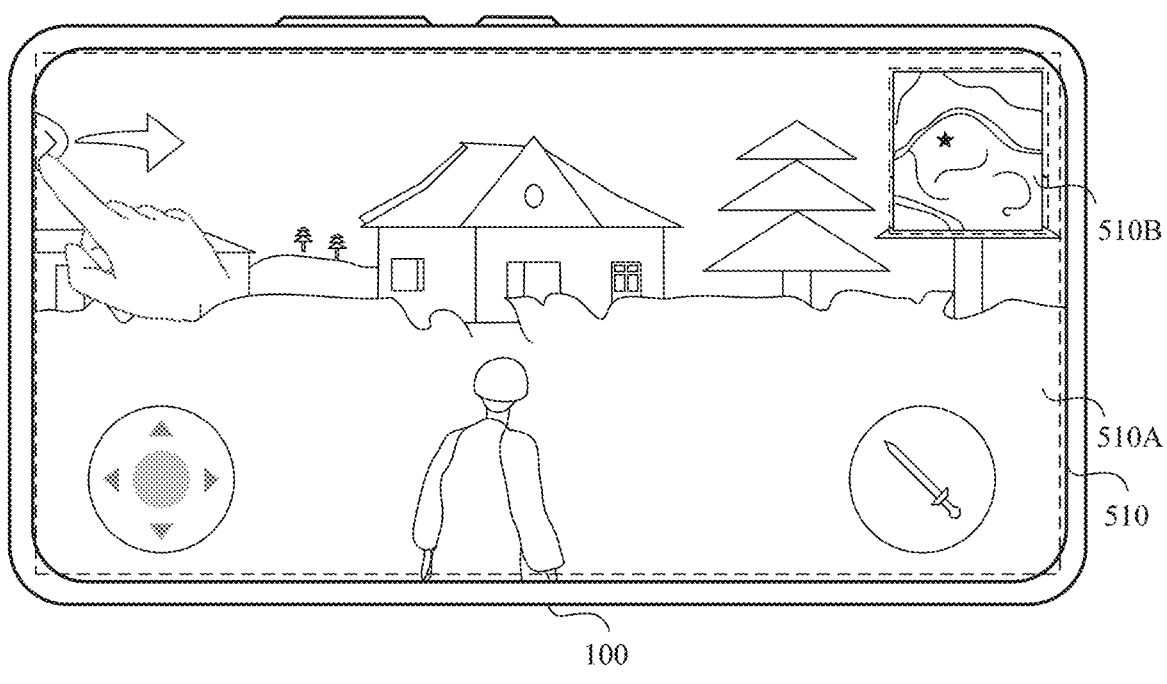

As shown in FIG. 6A, in response to a user operation performed on the Game A application icon 412 on the user interface 410, the electronic device 100 may start the Game A application, and display a game interface 510 shown in FIG. 6B. The game interface 510 may include a game scene area 510A and a map area 510B. For the game scene area 510A and the map area 510B, respectively refer to the game scene area 210A and the map area 210B shown in FIG. 1. Details are not described herein again.

Figure 6C:
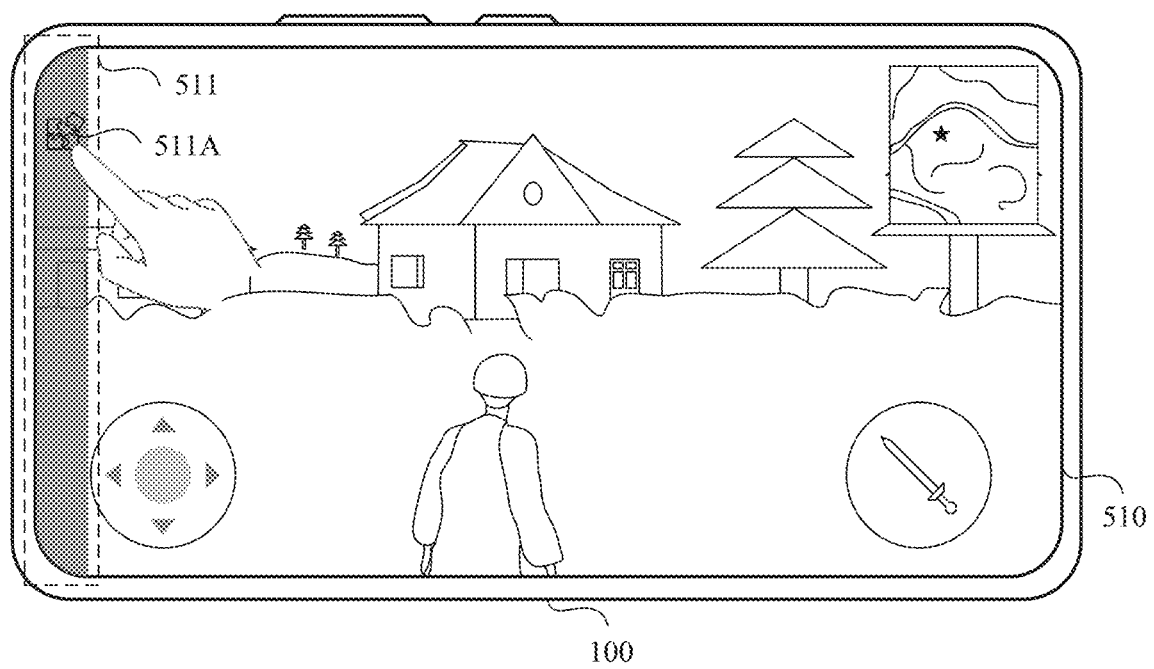

As shown in FIG. 6B, in response to a user operation of sliding inward on an upper left (or right) side of a screen of the electronic device 100, the electronic device 100 may invoke a side application bar 511 shown in FIG. 6C. The side application bar 511 may include an application assistant shortcut button 511A. The application assistant shortcut button 511A may be used by a user to quickly invoke an auxiliary service provided by the Application A for the Game A application.

Figure 6D:
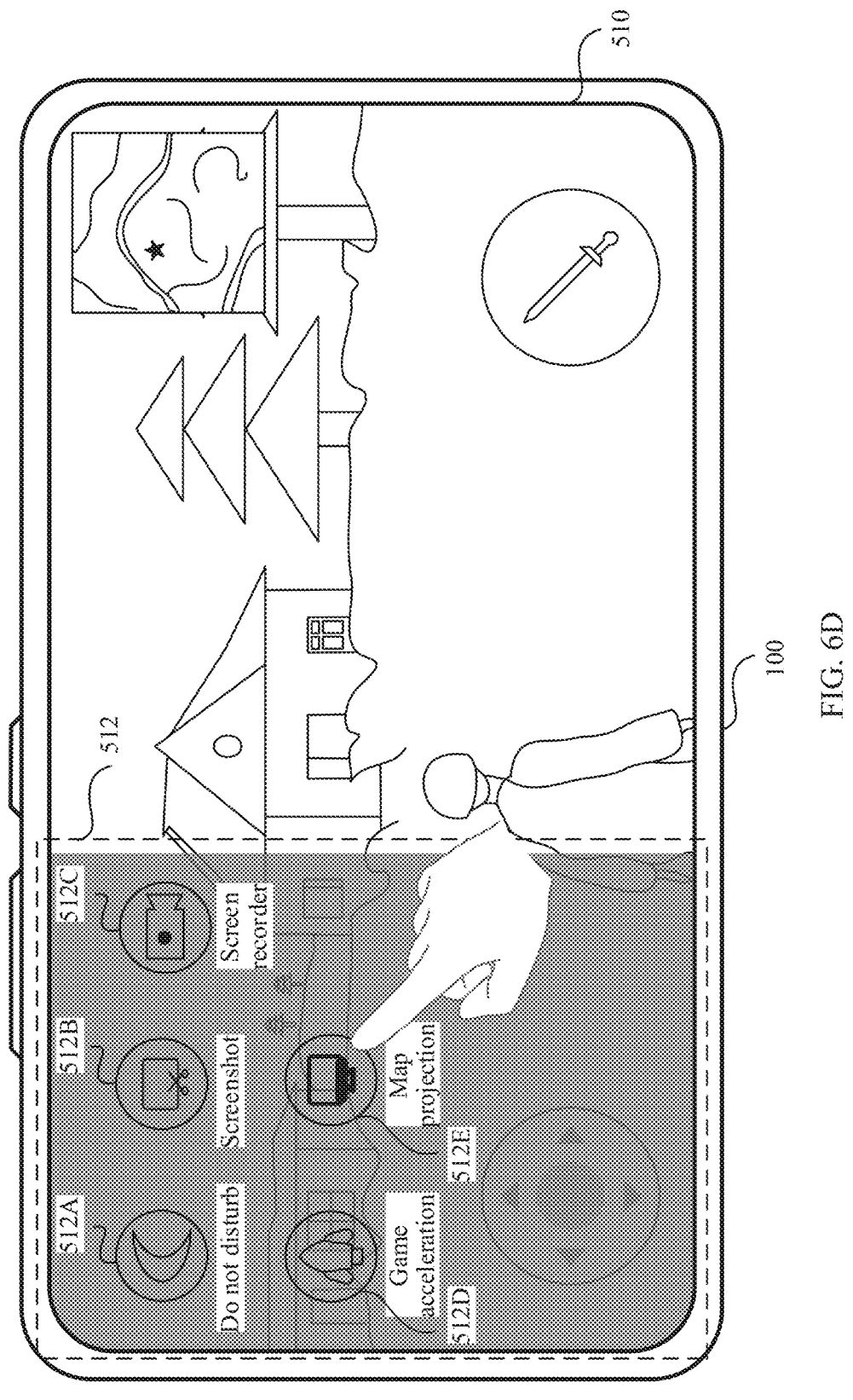

As shown in FIG. 6C, in response to a user operation performed on the application assistant shortcut button 511A, the electronic device 100 may display a service display area 512 shown in FIG. 6D. The service display area 512 may include one or more auxiliary service controls that can be provided by the Application A for the Game A application, for example, a Do not disturb control 512A, a Screenshot control 512B, a Screen recorder control 512C, a Game acceleration control 512D, a Map projection control 512E, and an all-service control 512F. In response to user operations performed on these controls, the electronic device 100 may invoke services respectively corresponding to these controls. For the services respectively corresponding to these controls, refer to the descriptions in the foregoing embodiments. Details are not described herein again.

Figure 6E:
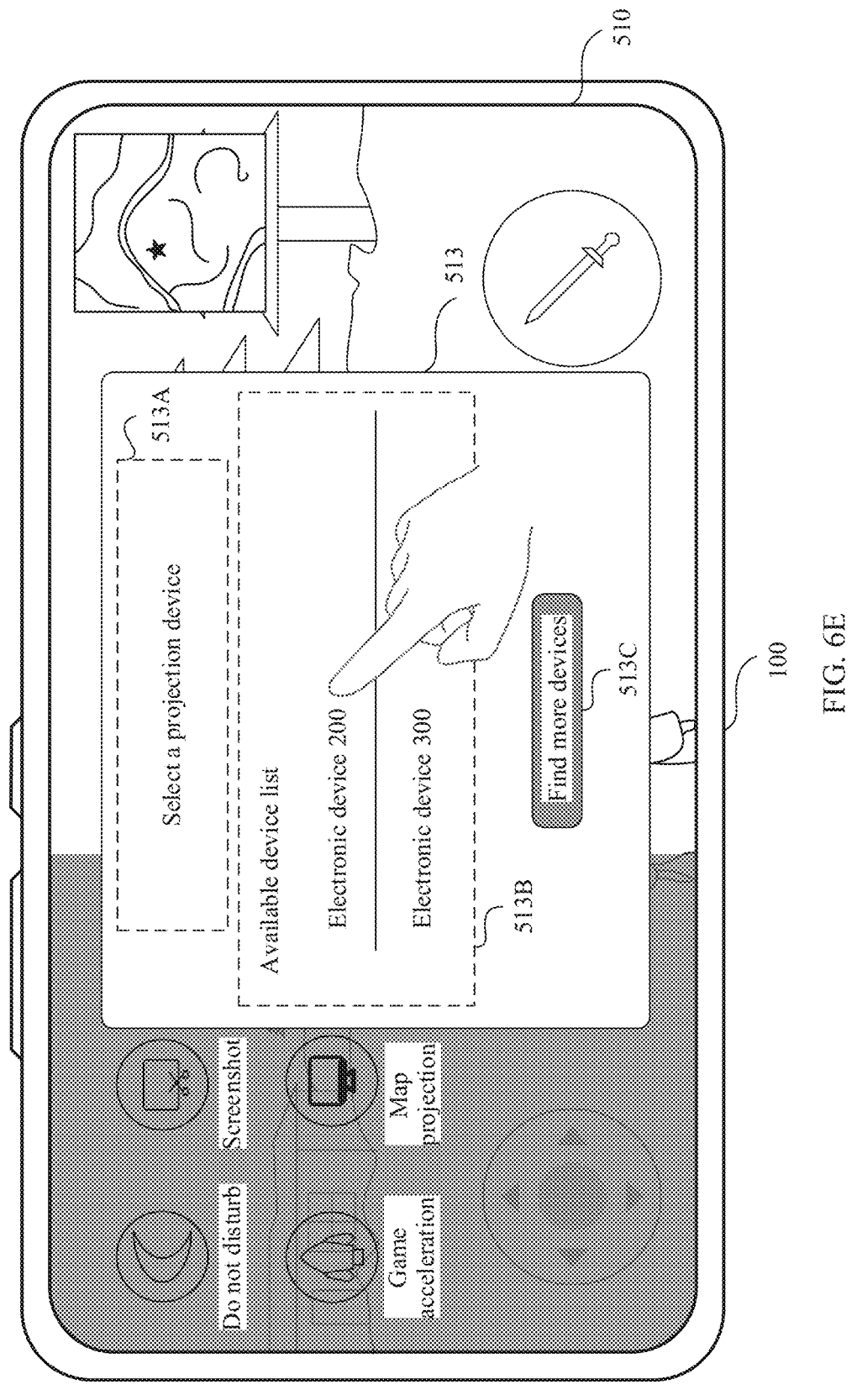

As shown in FIG. 6D, in response to a user operation performed on the Map projection control 512E, the electronic device 100 may search for a nearby electronic device that can be used for projection, and display a projection device option box 513 shown in FIG. 6E. The electronic device that can be used for projection may be an electronic device that is in a same local area network (for example, same home Wi-Fi) as the electronic device 100 and that has a display. A method for searching, by the electronic device 100, for the nearby electronic device that can be used for projection is not limited in embodiments of this application.

As shown in FIG. 6E, the projection device option box 513 may include a prompt 513A, an available device list 513B, and a device search control 513C.

The prompt 513A may be used to prompt the user with a function of the Map projection service. The prompt 513A may be text information "Select a projection device". Specific content of the prompt 513A is not limited in embodiments of this application.

The device search control 513C may be configured to trigger the electronic device 100 to search for the nearby electronic device that can be used for projection. The device search control 513C may include a text prompt "Find more devices". The text prompt on the device search control 513 is not limited in embodiments of this application.

The available device list 513B may be used to display options for electronic devices that are found by the electronic device 100 and that can be used for projection, for example, an option for an electronic device 200 and an option for an electronic device 300. For example, in response to a user operation performed on the option for the electronic device 200, the electronic device 100 may request to establish a communication connection to the electronic device 200.

When receiving the request that the electronic device 100 requests to establish the communication connection, the electronic device 200 may establish the communication connection to the electronic device 100.

The electronic device 100 may intercept, based on a target instruction library, a map instruction stream from a graphics instruction stream of the game interface 510. The electronic device 100 may locally display the game scene area 510A based on an instruction stream, for example, a game scene instruction stream, remained after an instruction stream interception operation.

Figure 6F:
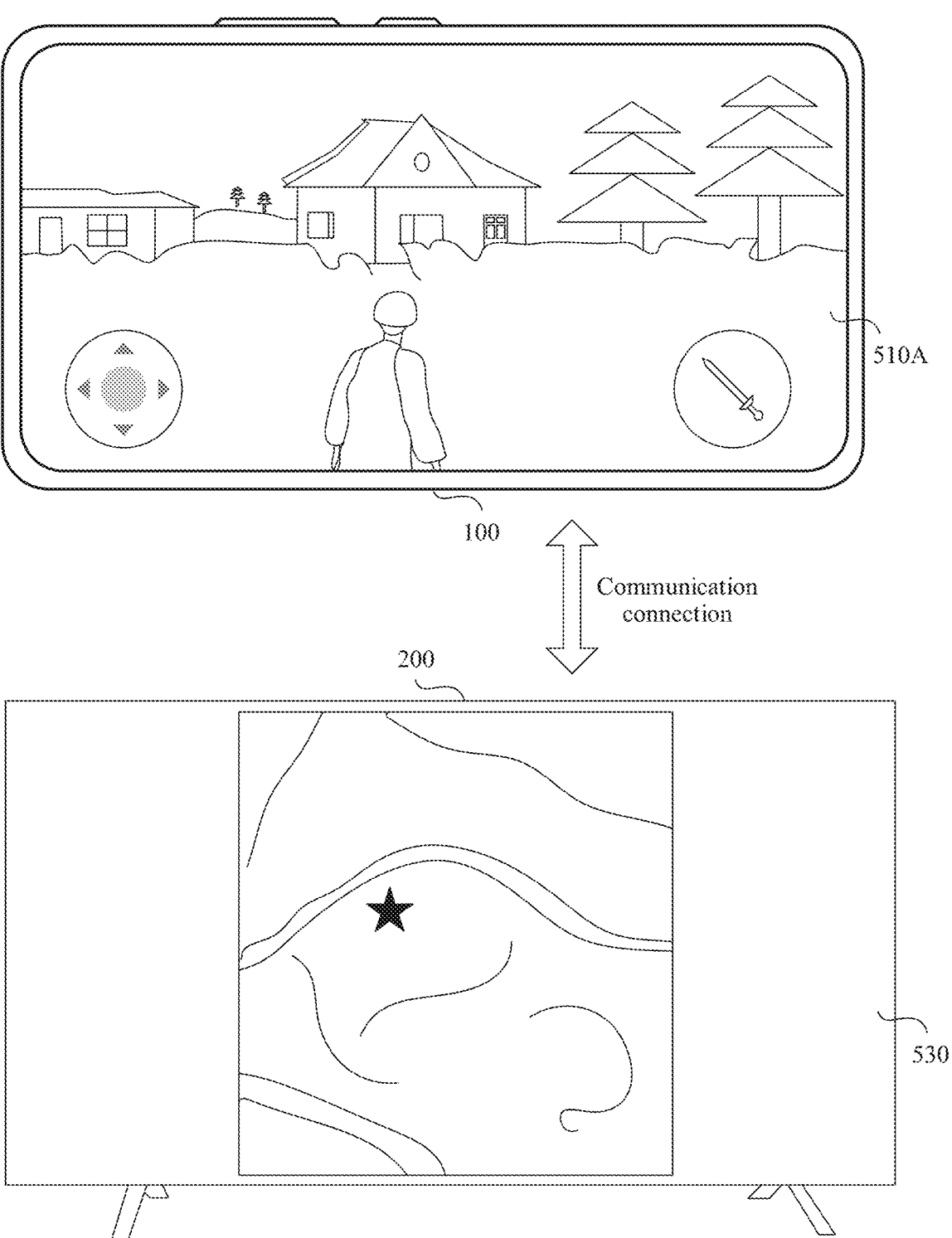

As shown in FIG. 6F, when invoking the Map projection service, the electronic device 100 may display the game scene area 510A on the game interface. It can be learned that content in the game scene area 510A is not blocked by the map area 510B. Therefore, the user can view content in a wider field of view during game playing, so that game experience is better.

The electronic device 100 may send the map instruction stream to the electronic device 200, or send, to the electronic device 200, a video stream obtained by rendering and encoding the map instruction stream. The electronic device 200 may display a user interface 530 shown in FIG. 6F. The user interface 530 may include the map presented in the map area 510B shown in FIG. 6B.

In a possible implementation, the electronic device 100 sends the map instruction stream to the electronic device 200. The electronic device 200 may zoom in or out a parameter in the map instruction stream based on a ratio of screen resolution of the electronic device 100 to screen resolution of the electronic device 200. In this way, a size of the map in the map area 510B may adapt to a size of a screen of the electronic device 200.

In another possible implementation, the electronic device 100 sends, to the electronic device 200, the video stream obtained by rendering and encoding the map instruction stream. The electronic device 200 may zoom in or out each frame of image in the video stream based on a ratio of screen resolution of the electronic device 100 to screen resolution of the electronic device 200. In this way, a size of the map in the map area 510B may adapt to a size of a screen of the electronic device 200.

In some embodiments, when running an application (for example, the Game A application) associated with the Application A, the electronic device 100 may run the Application A, and invoke an auxiliary service (for example, the Map projection service) that can be provided by the Application A. In other words, the user may not perform user operations that are used to invoke the Map projection service and that are shown in FIG. 6B to FIG. 6D. This can simplify user operations in the map projection process.

It can be learned from the embodiment shown in FIG. 6A to FIG. 6F that the content in the game scene area 510A in the Game A application may be displayed on the electronic device 100. Content in the map area 510B in the Game A application may be projected onto the electronic device 200, and displayed by the electronic device 200. In this way, in a process of playing the Game A, the user can perform game control on the electronic device 100, and view the map on the electronic device 200. When the user performs game control on the electronic device 100, a field of view of the user is no longer blocked by the map area 510B, so that better game experience can be obtained.

Figure 7A:
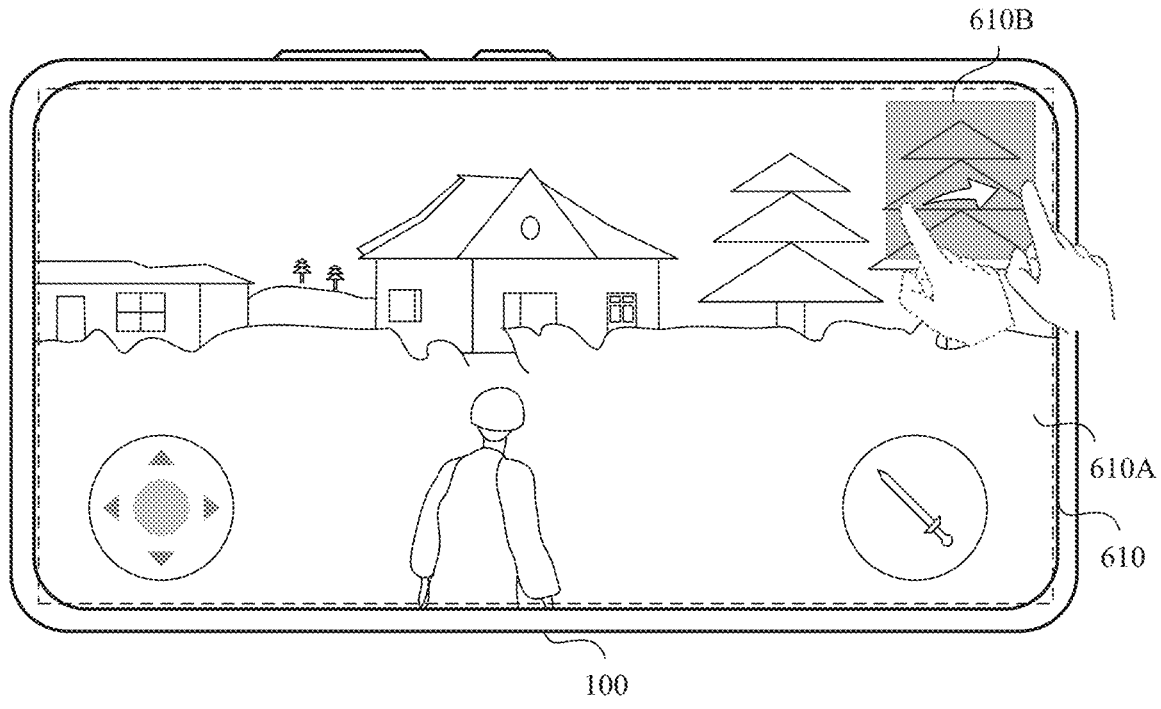
FIG. 7A and FIG. 7B are schematic diagrams of another projection scenario of an electronic device 100 according to an embodiment of this application.
Figure 7B:
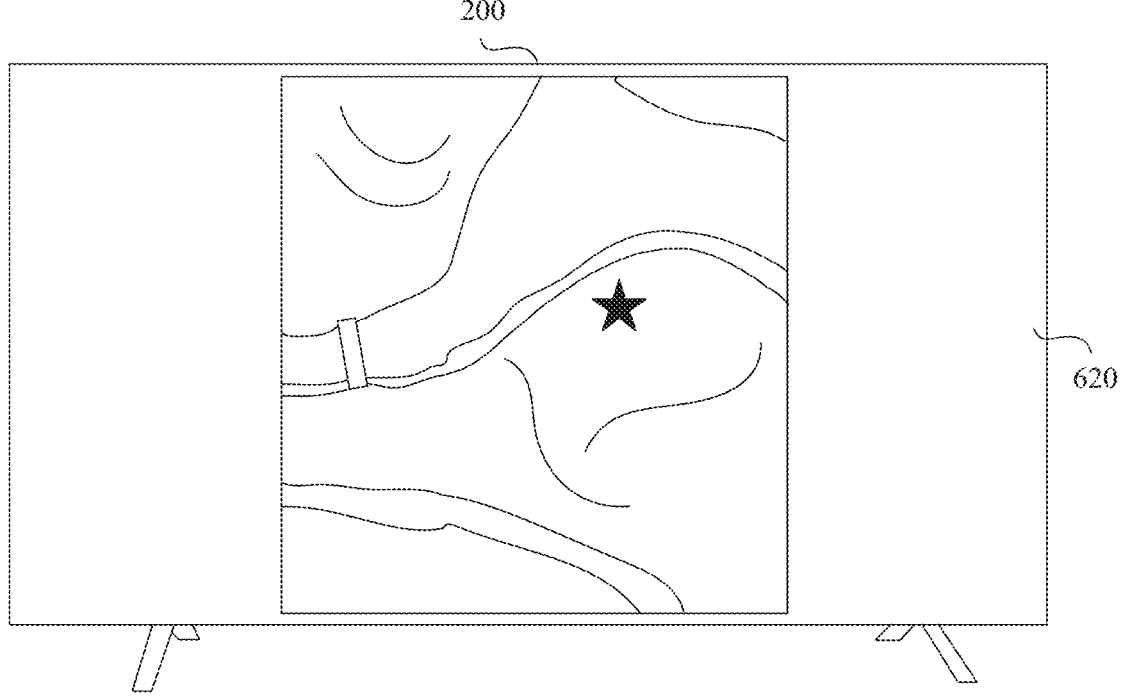

FIG. 7A and FIG. 7B are Schematic Diagrams of Another Example User Interface of the Electronic Device 100 and Another Example User Interface of the Electronic Device 200 after Projection.

In some embodiments, when invoking the Map projection service, the electronic device 100 may display a game interface 610 shown in FIG. 7A. The game interface 610 may include a game scene area 610A and a map identification area 610B. For the game scene area 610A, refer to the descriptions of the game scene area 210A in FIG. 1. Details are not described herein again. The map identification area 610B may be used to identify a location of the map area 510B shown in FIG. 6A before projection. The map identification area 610B may cover the game scene area 610A. A size of the map identification area 610B and a location of the map identification area 610B on the game interface 610 may be the same as a size of the map area 510B and a location of the map identification area 510B on the game interface 510 in FIG. 6A. Different from the content in the map area 510B, content in the map identification area 610B may be a layer that has a solid color and specific transparency and that is shown in FIG. 7A. The layer having the solid color and the specific transparency does not completely block a part that is of the game scene area 610A and that is covered by the map identification area 610B.

Optionally, the content in the map identification area 610B may be a border of a same size as the map area 510B.

An instruction used to draw the content in the map identification area 610B may be obtained from the target instruction library. To be specific, in addition to the map instruction stream used to draw the content in the map area 510B, the target instruction library further includes a map identification instruction stream used to draw the content in the map identification area 610B. When receiving a user operation used to invoke the Map projection service, the electronic device 100 may intercept the map instruction stream from the graphics instruction stream used to draw the game interface 510 (namely, the game interface before projection). The electronic device 100 may locally display the game interface 610 shown in FIG. 7A based on an instruction stream (for example, a game scene instruction stream) remained after the instruction stream interception operation and the map identification instruction stream obtained from the target instruction library.

In a possible implementation, the instruction used to draw the content in the map identification area 610B may be generated by the electronic device 100. The electronic device 100 may generate the map identification instruction stream based on the map instruction stream. For example, the size and the location of the map identification area 610B are respectively the same as the size and the location of the map area 510B. The instruction and a value of a parameter that are in the map identification instruction stream may be determined by the instruction and the value of the parameter that are in the map instruction stream.

A specific form of the content displayed in the map identification area 610B is not limited in this embodiment of this application.

In some embodiments, as shown in FIG. 6B, the electronic device 100 may correspondingly respond to a user operation performed on the map area 510B on the game interface 510. For example, in response to a user operation of sliding right in the map area 510B, the electronic device 100 may adjust the map displayed in the map area 510B. The map displayed in the map area 510B is moved rightward. An amount of rightward movement of the map may be determined by an amount of rightward slide in the user operation. After the movement, the map area 510B may display a map that is connected to a left edge of the map before the movement but is not displayed. A part that is moved out of the map area 510B after the map is moved rightward is hidden. In other words, the user may slide in the map area 510B in various directions to adjust the map displayed in the map area 510B, so that different areas in the map are viewed.

When invoking the Map projection service, the electronic device 100 may correspondingly respond to a user operation performed on the map identification area 610B on the game interface 610. As shown in FIG. 7A, in response to a user operation of sliding rightward in the map identification area 610B, the electronic device 100 may obtain a map instruction stream used to draw a map that may be displayed in the map area 510B shown in FIG. 6B after the map is moved rightward.

As shown in FIG. 7B, the electronic device 200 may display, on the user interface 610 based on the map instruction stream, the map after the rightward movement. An amount of rightward movement of the map may be determined by an amount of rightward slide in the user operation.

Before the electronic device 100 receives the user operation of sliding rightward in the map identification area 610B, for the map projected by the electronic device 100 onto the electronic device 200, refer to the map shown in FIG. 6F. After the electronic device 100 receives the user operation of sliding rightward in the map identification area 610B, for the map projected by the electronic device 100 onto the electronic device 200, refer to the map shown in FIG. 7B. It can be learned from a comparison between FIG. 6F and FIG. 7B that, after the movement, a user interface 620 may display the map that is connected to the left edge of the map on the user interface 530 but is not displayed on the user interface 530. A part that is moved out of a right edge of the map on the user interface 530 after the map is moved rightward is hidden. An amount of rightward movement of the map may be determined by an amount of rightward slide in the user operation.

In other words, after the Map projection service is invoked, the user operation that is originally performed on the map area 510B is still valid. In response to the user operation performed on the map identification area 610B (the map area 510B is originally displayed), the electronic device 100 may adjust the map that should be displayed in the map area 510B. The map that should be displayed in the map area 510B is projected onto the electronic device 200. In this case, the map displayed in the electronic device 200 is also adjusted accordingly. In this way, after the Map projection service is invoked, the user may still perform a corresponding user operation in the map identification area 610B. For example, the user may slide in the map identification area 610B in various directions to adjust the map displayed on the user interface 620, so that different areas in the map are viewed. The user operation performed on the map identification area 610B (or the map area 510B) is not limited in this embodiment of this application.

In addition, because the content displayed in the map identification area 610B may be the layer having the solid color and specific transparency (or the border of the same size as the map area 510B), the map identification area 610B does not completely block the part that is of the game scene area 610A and that is covered by the map identification area 610B. Compared with the game interface 510 before projection, a game interface after projection enables the user to view content in a larger field of view when performing game control on the electronic device 100, so that better game experience can be obtained.

Figure 8A:
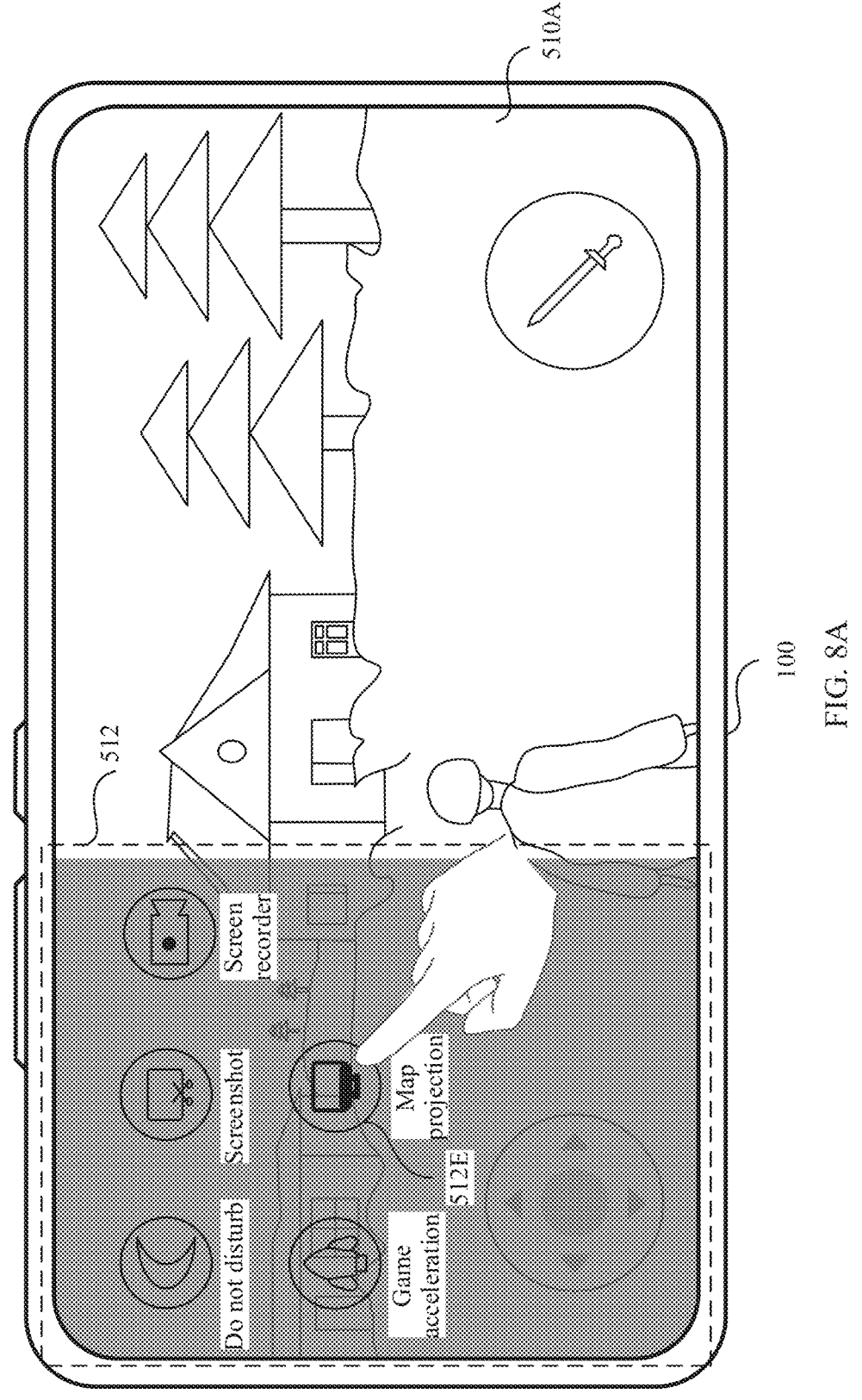
FIG. 8A and FIG. 8B are schematic diagrams of a scenario in which an electronic devices 100 ends projection according to an embodiment of this application.
Figure 8B:
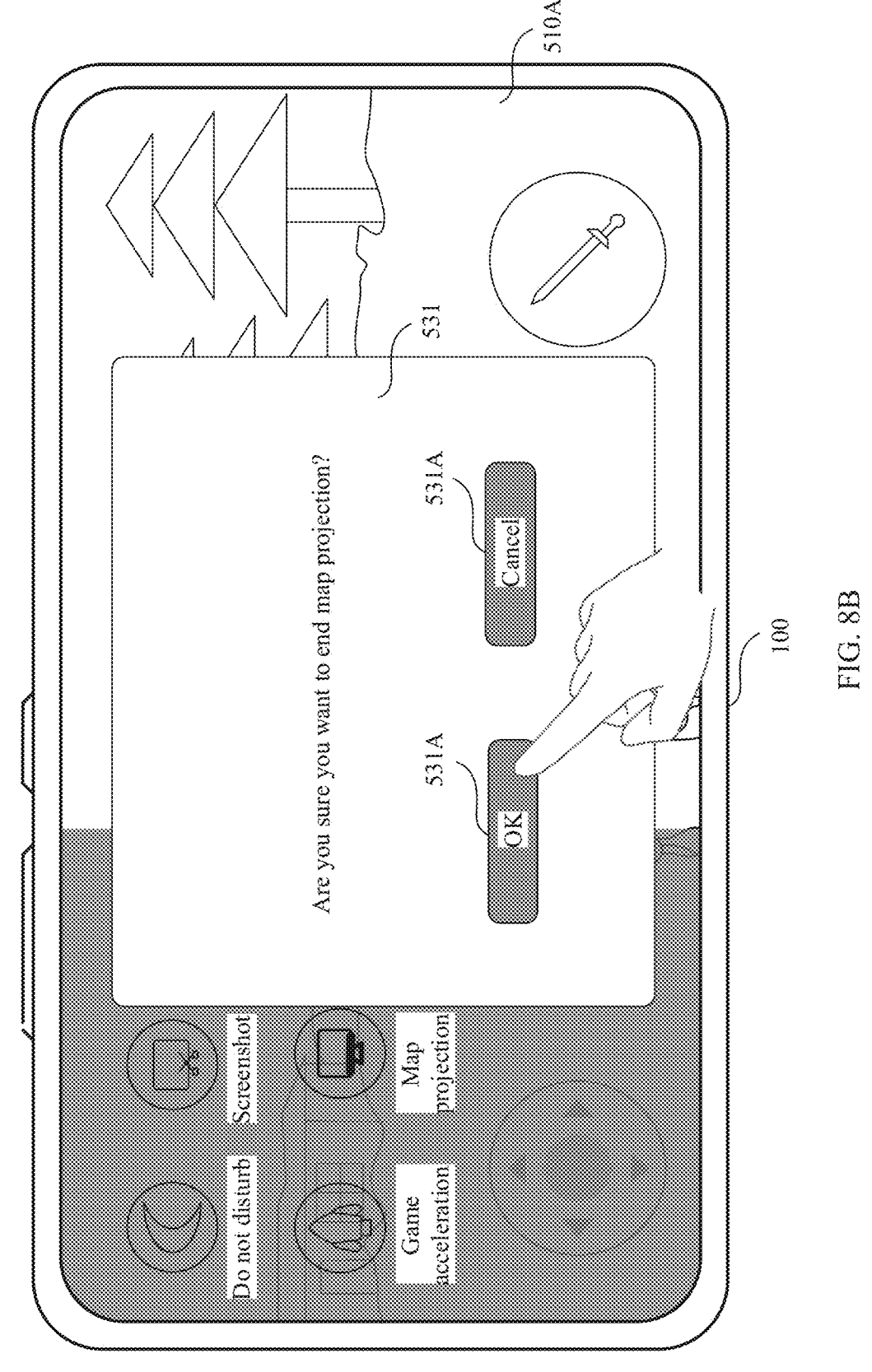

FIG. 8A and FIG. 8B are Schematic Diagrams of an Example Scenario in which the Electronic Device 100 Ends the Map Projection Service.

As shown in FIG. 8A, the electronic device 100 invokes the Map projection service, and displays the content in the game scene area 510A on the game interface. The electronic device 100 may display the service display area 512 by using the user operations shown in FIG. 6A and FIG. 6B. In response to a user operation performed on the Map projection control 512E, the electronic device 100 may end the Map projection service.

As shown in FIG. 8B, in response to the user operation performed on the Map projection control 512E, the electronic device 100 may display a service end prompt box 531. The service end prompt box 531 may include a text prompt "Are you sure you want to end map projection?", to ask the user whether to end the Map projection service. Specific content of the text prompt is not limited in this embodiment of this application. The service end prompt box 531 may further include an OK control 531A and a Cancel control 531B. The OK control 531A may be configured to trigger the electronic device 100 to end the Map projection service. The Cancel control 531B may indicate the electronic device 100 to continue to project the map onto the electronic device 200.

In response to a user operation performed on the OK control 531A, the electronic device 100 may display the game interface 510 shown in FIG. 6B. The game interface 510 may include the game scene area 510A and the map area 510B. The map area 510B covers the game scene area 510A, and blocks a part of the content in the game scene area 510A.

When the Map projection service ends, the electronic device 100 may stop intercepting, by using the target instruction library, the map instruction stream from the graphics instruction stream used to draw the game interface 510. In other words, the electronic device 100 may locally display, based on the graphics instruction stream used to draw the game interface 510, the user interface 510 shown in FIG. 6B.

The user operation used to end the Map projection service is not limited in this embodiment of this application. Based on the Foregoing Scenario of Invoking the Map Projection Service, the Following Describes a Schematic Diagram of a Structure of a Projection System According to an Embodiment of this Application.

Figure 9:
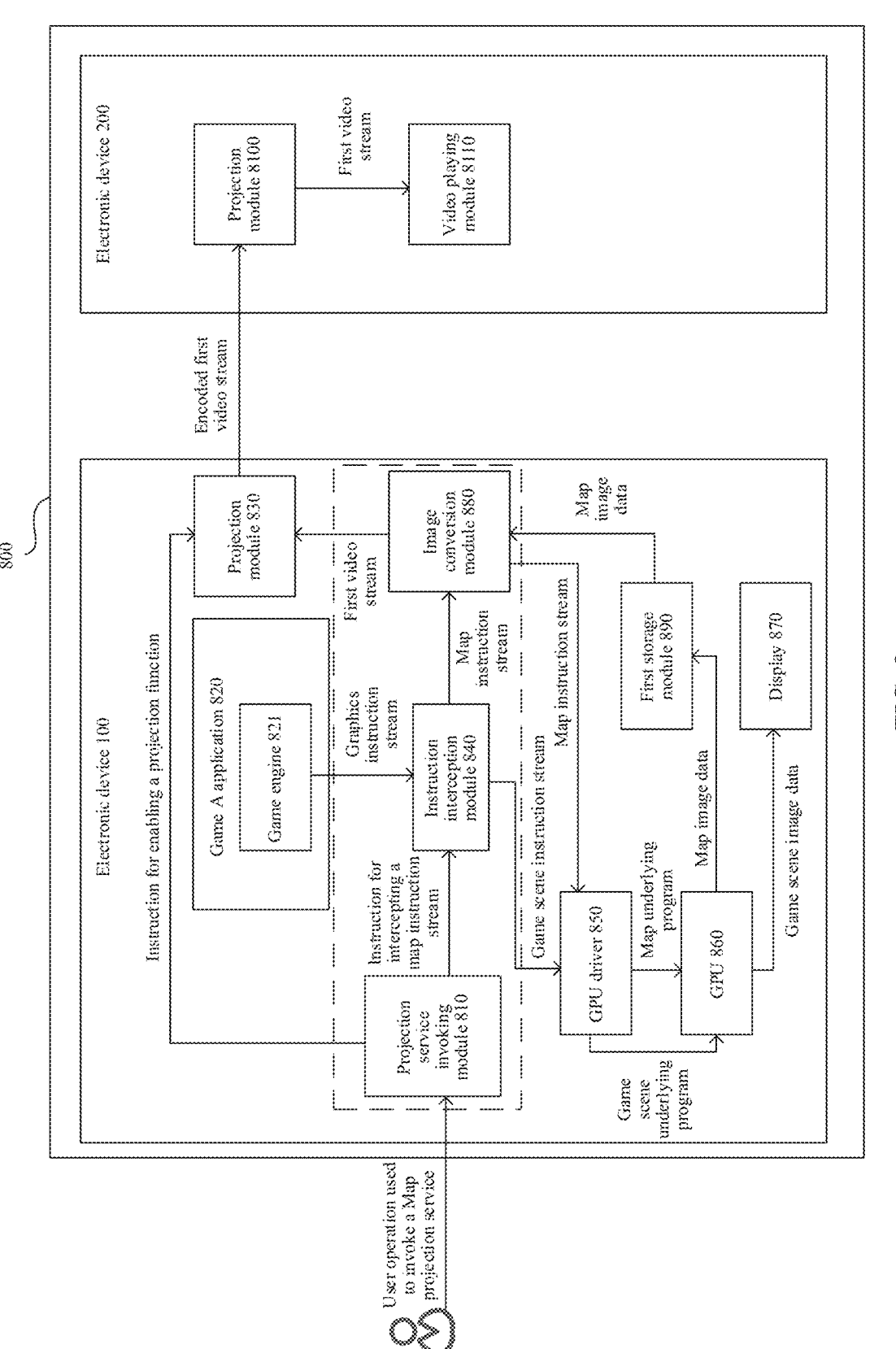
FIG. 9 is a schematic diagram of a structure of a projection system according to an embodiment of this application.

As shown in FIG. 9, the projection system 800 may include an electronic device 100 and an electronic device 200. The electronic device 100 may include a projection service invoking module 810, a Game A application 820, a projection module 830, an instruction interception module 840, a GPU driver 850, a GPU 860, a display 870, an image conversion module 880, and a first storage module 890. The electronic device 200 may include a projection module 8100 and a video playing module 8110.

Before a user operation used to invoke the Map projection service is received, the electronic device 100 may display a game interface on the display 870 by using the Game A application 820, the instruction interception module 840, the GPU driver 850, and the GPU 860. The Game A application 820 may include a game engine 821. The game engine 821 may obtain a parameter (for example, a size of the map area 510B shown in FIG. 6B, a size of a building, or a size of a player character) used to draw the game interface in the Game A application. The game engine 821 may invoke a 3D graphics processing library to obtain a graphics instruction stream used to draw the game interface. The game engine 821 may transmit the graphics instruction stream to the instruction interception module 840.

The instruction interception module 840 may obtain an interface for receiving the graphics instruction stream from the game engine 821. The game engine 821 may transmit the graphics instruction stream through the interface for receiving the graphics instruction stream. In this case, the instruction interception module 840 may receive the graphics instruction stream.

When an instruction used to intercept a map instruction stream is not received, the instruction interception module 840 may directly transmit the received graphics instruction stream to the GPU driver 850. The GPU driver 850 may convert an instruction in the graphics instruction stream into an underlying program, and drive the GPU 860 to execute the underlying program. The underlying program is a program (for example, machine code) that can be executed by the GPU 860. The GPU 860 executes the underlying program to obtain image data of the game interface, and transmits the image data of the game interface to the display 870. The display 870 may display the game interface (the game interface 510 shown in FIG. 6B) of a Game A.

If the electronic device 100 receives the user operation used to invoke the Map projection service, the electronic device 100 and the electronic device 200 may respectively display, based on the projection system shown in FIG. 9, content in the game scene area 510A and content in the map area 510B that are shown in FIG. 6B.

Specifically, the electronic device 100 may run an application corresponding to the Game A application 820. The electronic device 100 may display the game interface on the display 870 by using the game engine 821, the instruction interception module 840, the GPU driver 850, and the GPU 860 according to the method in the foregoing embodiments. When the user operation used to invoke the Map projection service is detected, the projection service invoking module 810 may send, to the instruction interception module 840, the instruction for intercepting the map instruction stream, and send, to the projection module 830, an instruction for enabling a projection function. The user operation used to invoke the Map projection service may be, for example, a touch operation that is performed on the Map projection control 512E and that is shown in FIG. 6D.

In some embodiments, when the electronic device 100 detects the user operation used to invoke the Map projection service, a communication connection may be established between the electronic device 100 and the electronic device 200 for transmitting data that needs to be projected. A projection protocol (such as Miracast, DLNA, or AirPlay) in the conventional technology may be used between the electronic device 100 and the electronic device 200 for transmitting the data that needs to be projected. A projection protocol used for transmitting data between the electronic device 100 and the electronic device 200 is not limited in this embodiment of this application. Optionally, a protocol used for transmitting content that needs to be projected may alternatively be a proprietary protocol agreed on between the electronic device 100 and the electronic device 200.

For example, when the projection module 830 receives the instruction for enabling the projection function, the electronic device 100 may search for an electronic device that is in same home Wi-Fi as the electronic device 100 and that has the projection function, and display the user interface shown in FIG. 6E.

Optionally, the communication connection between the electronic device 100 and the electronic device 200 may be established before the electronic device 100 detects the user operation used to invoke the Map projection service.

When receiving the instruction for intercepting the map instruction stream, the instruction interception module 840 may intercept, by using the target instruction library, the map instruction stream from the graphics instruction stream used to draw the game interface. The graphics instruction stream used to draw the game interface is sent by the game engine 821. The graphics instruction stream may include the map instruction stream and a game scene instruction stream. A method for intercepting, by the instruction interception module 840, the map instruction stream may specifically be: The instruction interception module 840 obtains the target instruction library corresponding to the Game A application. The target instruction library corresponding to the Game A application includes an instruction used to draw a map area (the map area 510B shown in FIG. 6B) on a user interface of the Game A. The instruction interception module 840 may determine, from the received graphics instruction stream, an instruction that matches the target instruction library, and perform an interception operation. In this way, the instruction interception module 840 may distinguish between the map instruction stream and the game scene instruction stream in the graphics instruction stream.

After intercepting the graphics instruction stream, the instruction interception module 840 may transmit the game scene instruction stream to the GPU driver 850, and transmit the map instruction stream to the image conversion module 860.

When receiving the game scene instruction stream, the GPU driver 850 may convert the instruction in the game scene instruction stream into a game scene underlying program, and drive the GPU 860 to execute the game scene underlying program. The game scene underlying program is a program (for example, machine code) that can be executed by the GPU 860. The GPU 860 may execute the game scene underlying program to obtain game scene image data, and transmit the game scene image data to the display 870. The display 870 may display the content in the game scene area (the game scene area 510A shown in FIG. 6F).

When receiving the map instruction stream, the image conversion module 880 may transmit the map instruction stream to the GPU driver 850. In addition, the image conversion module 880 may further obtain an address of the first storage module 890, and transmit the address of the first storage module 890 to the GPU driver 850. The GPU driver 850 may convert the instruction in the map instruction stream into a map underlying program, and drive the GPU 860 to execute the map underlying program. The GPU driver 850 may indicate the GPU 860 to store, in the first storage module 890, data obtained by executing the map underlying program. The map underlying program is a program (for example, machine code) that can be executed by the GPU 860. The GPU 860 may execute the map underlying program to obtain map image data. The GPU 860 may store the map image data in the first storage module 890 based on the address of the first storage module 890. The GPU may concurrently process the game scene underlying program and the map underlying program.

The image conversion module 880 may obtain the map image data from the first storage module 890, and convert the map image data into a first video stream. The image conversion module 880 may encode an image in an encoding manner such as H.264 or H.265, and convert the image into a video stream. A method for performing encoding by the image conversion module 880 is not limited in this embodiment of this application.

In some embodiments, the image conversion module 880 may encode every k consecutive frames of images, convert the every k consecutive frames of images into a video stream, and transmit the video stream including the k frames of images to the projection module 830. To be specific, each time the electronic device 100 obtains k frames of map images, the electronic device 100 may send data including the k frames of map images to the electronic device 200. The electronic device 200 may display the k frames of map images. The content in the map area 510B shown in FIG. 6B may vary with the content in the game scene area 510A. A value of the k should not be excessively large. If the value of the k is excessively large, content displayed on the electronic device 100 may not be synchronized with content displayed on the electronic device 200. A value of the k may be set based on an empirical value. A value of the k is not limited in this embodiment of this application. According to the foregoing method, a delay in separately displaying, on the electronic device 100 and the electronic device 200, two parts of display content on the game interface of the Game A application 820 can be reduced, and occurrence of the case in which the content displayed on the electronic device 100 is not synchronized with the content displayed on the electronic device 200 can be reduced.

The image conversion module 880 may transmit the first video stream to the projection module 830.

The projection module 830 may encode the first video stream based on the projection protocol used between the electronic device 100 and the electronic device 200, and send an encoded first video stream to the electronic device 200.

The projection module 8100 in the electronic device 200 may receive the encoded first video stream. The projection module 8100 may decode the encoded first video stream based on the projection protocol used between the electronic device 100 and the electronic device 200, to obtain the first video stream. The projection module 8100 may transmit the first video stream to the video playing module 8110.

The video playing module 8110 may be configured to play the images included in the first video stream. In this way, the content that is originally displayed in the map area 510B on the game interface 510 of the electronic device 100 is projected onto the electronic device 200 (refer to the user interface 530 shown in FIG. 6F). After performing projection processing, the electronic device 100 may no longer display the content in the map area 510B shown in FIG. 6B.

In some embodiments, the electronic device 200 may obtain screen resolution of the electronic device 100. The electronic device 200 may zoom in or out each frame of image in the video stream based on a ratio of the screen resolution of the electronic device 100 to screen resolution of the electronic device 200. In this way, a size of the map in the map area 510B may adapt to a size of a screen of the electronic device 200.

In some embodiments, the projection service invoking module 810, the instruction interception module 840, and the image conversion module 880 may all be modules in the Application A in the foregoing embodiments. To be specific, the electronic device 100 in which the Application A is installed may implement, by using the projection service invoking module 810, the instruction interception module 840, and the image conversion module 880, the display method provided in embodiments of this application.

It can be learned from the projection system 800 shown in FIG. 9 that the content in the game scene area 510A in the Game A application may be displayed on the electronic device 100. The content in the map area 510B in the Game A application may be projected onto the electronic device 200, and displayed by the electronic device 200. In this way, in a process of playing the Game A, the user can perform game control on the electronic device 10, and view the map on the electronic device 200. When the user performs game control on the electronic device 100, a field of view of the user is no longer blocked by the map area 510B, so that better game experience can be obtained.

In addition, the electronic device 100 may implement the display method by using the Application A. That is, an application that requires projection does not need to be modified. In this way, when a developer of a third-party application does not adaptively modify the application, the electronic device 100 may project, onto another device, a part of display content on a user interface of the third-party application. In this case, the display method provided in this application is applicable to a plurality of types of applications such as a game application, a live broadcast application, or a video call application.

In some embodiments, the target instruction library corresponding to the Game A application 820 further includes a map identification instruction stream. The map identification instruction stream may be used to draw content in the map identification area 610B shown in FIG. 7A. For example, the content in the map identification area 610B may be a layer having a solid color and specific transparency. For the map identification area 610B, refer to the descriptions in the foregoing embodiments. Details are not described herein again. The map identification instruction stream may be determined based on the map instruction stream. For example, an instruction and a parameter that are in the map identification instruction stream and that correspond to a size of the map identification area 610B and a location of the map identification area 610B in the game interface 610 are the same as an instruction and a parameter that are in the map identification instruction stream and that correspond to a size of the map area 510B and a location of the map area 510B in the game interface 510. The instruction interception module 840 may obtain the map identification instruction stream from the target instruction library, and combine the map identification instruction stream with the game scene instruction stream. The map identification instruction stream may replace the map instruction stream in the graphics instruction stream used to draw the game interface 510, to implement combination of the map identification instruction stream and the game scene instruction stream.

The instruction interception module 840 may transmit the combined map identification instruction stream and game scene instruction stream to the GPU driver 850. The electronic device 100 may display, based on the game scene instruction stream and the map identification instruction stream, the game interface 610 shown in FIG. 7A.

When the Game A application 820 receives the user operation performed on the map identification area 610B shown in FIG. 7A (in other words, the map area 510B before projection is displayed in FIG. 6B), the map that may be displayed in the map area 510B is adjusted in response to the user operation. The game engine 821 may obtain a parameter (for example, a feature of an element in the map) after the map is adjusted, and invoke the 3D graphics processing library to obtain the graphics instruction stream. The graphics instruction stream includes an instruction stream used to draw an adjusted map. The game engine 821 may assign a value to a parameter in an instruction w % ben invoking the 3D graphics processing library. The parameter in the instruction may include the parameter after map adjustment.

Further, the instruction interception module 840 may intercept the map instruction stream from the graphics instruction stream. The map instruction stream may be used to draw the map that is adjusted in response to the user operation. The electronic device 100 transmits projected data (namely, the video stream obtained by converting the map instruction stream) to the electronic device 200. The electronic device 200 may display the adjusted map.

In some other embodiments, when invoking the Map projection service, the electronic device 100 may perform rendering on a local display based on an instruction stream remained after instruction stream interception operation, to display the content in the game scene area 510A shown in FIG. 6F. When detecting the user operation performed on the originally displayed map area 510B, the electronic device 100 may still make a corresponding response. A result of the response may be presented on the user interface of the electronic device 200.

It can be learned from the foregoing embodiments that, after the Map projection service is invoked, the user operation performed on the originally displayed map area 510B is still valid. For example, the user may slide in the map identification area 610B in various directions to adjust the map displayed on the user interface 620, so that different areas in the map are viewed. In addition, because the content displayed in the map identification area 610B may be the layer having the solid color and specific transparency (or a border of a same size as the map area 510B), the map identification area 610B does not completely block the part that is of the game scene area 610A and that is covered by the map identification area 610B. Compared with the game interface 510 before projection, a game interface after projection enables the user to view content in a larger field of view when performing game control on the electronic device 100, so that better game experience can be obtained.

The following describes an example of an instruction in the target instruction library by using an example in which the 3D graphics processing library invoked by the game engine 821 is OpenGL ES.

glTexImage2D (GL_TEXTURE_2D, 0, GL_RGB, width, height, 0, GL_RGB, GL_UNSIGNED_BYTE, data).

The instruction "glTexImage2D" may be used to generate a two-dimensional image. A first parameter in the instruction "glTexImage2D" may specify a type of the image. "GL_TEXTURE_2D" may indicate that the type of the image is the two-dimensional image. A second parameter in the instruction "glTexImage2D" may specify a level of image loading. The second parameter is 0, which indicates a level of an original picture that is not zoomed out. A third parameter in the instruction "glTexImage2D" may specify an internal format of the image. The internal format may indicate a format in which a pixel in the image is stored in a graphics card. "GL_RGB" may indicate that a color value of the pixel in the image is stored in an RGB format. Fourth and fifth parameters in the instruction "glTexImage2D" may respectively specify a width and a height of the image. A sixth parameter in the instruction "glTexImage2D" may specify a border width of the image. The sixth parameter is 0, which may indicate that the border width of the image is 0. A seventh parameter in the instruction "glTexImage2D" may specify a storage format of the pixel in the image in a memory. The seventh parameter is "GL_RGB", which may indicate that the color value of the pixel in the image is stored in the memory in the RGB format. An eighth parameter in the instruction "glTexImage2D" may specify a data type of the pixel in the image in the memory. A ninth parameter in the instruction "glTexImage2D" may specify a pointer pointing to a storage location of image data in the memory.

For example, the content in the map area 510B shown in FIG. 6B is a two-dimensional image. The two-dimensional image may be generated by using the instruction "glTexImage2D". The target instruction library may include the instruction and a parameter that is in the instruction and that corresponds to the content in the map area 510B. The electronic device 100 may intercept, by matching a name of the instruction in the target instruction library and the parameter in the instruction, the map instruction stream from the graphics instruction stream used to draw the game interface.

glDrawElements (GL_TRIANGLE, 36, GL_UN-SIGNED_SHORT, 0).

The instruction "glDrawElements" may be used to draw a diagram element. The diagram element is a basic graphic for rendering. The diagram element includes a vertex. A vertex, a line segment, a triangle, or a polygon may be the diagram element. A first parameter in the instruction "glDrawElements" may specify a type of the diagram element. "GL_TRIANGLE" indicates that the type of the diagram element is a triangle. A second parameter in the instruction "glDrawElements" is a product of a quantity of drawn diagram elements and a quantity of vertices of a diagram element. Because the type of the diagram element is a triangle, a quantity of vertices of the diagram element is 3. The second parameter in the instruction "glDrawElements" is 36, which may indicate a quantity of drawn diagram elements is 12. A third parameter in the instruction "glDrawElements" may specify a data type of diagram element data. A fourth parameter in the instruction "glDrawElements" may indicate a pointer pointing to a storage location of the diagram element data in a memory.

For example, the content in the map area 510B shown in FIG. 6B may include a location marker of a player character in the map. The location marker may be generated by using the instruction "glDrawElements". The target instruction library may include the instruction and a parameter that is in the instruction and that corresponds to the location marker. The electronic device 100 may intercept, by matching a name of the instruction in the target instruction library and the parameter in the instruction, the map instruction stream from the graphics instruction stream used to draw the game interface.

In the graphics instruction stream used to draw the game interface, a specific value of the parameter may be obtained by the game engine 821 from a local Game A application package or from a game server.

The instruction "glTexImage2D" and the instruction "glDrawElements" are merely examples for description in embodiments of this application, and shall not constitute a limitation on this application. This is not limited to the example instructions, and the target instruction library may further include more instructions. Different applications may correspond to different target instruction libraries. The electronic device 100 may intercept, by using a target instruction library corresponding to an application, for example, the target instruction library corresponding to the Game A application 820, the map instruction stream used to draw the content in the map area 510B.

Figure 10:
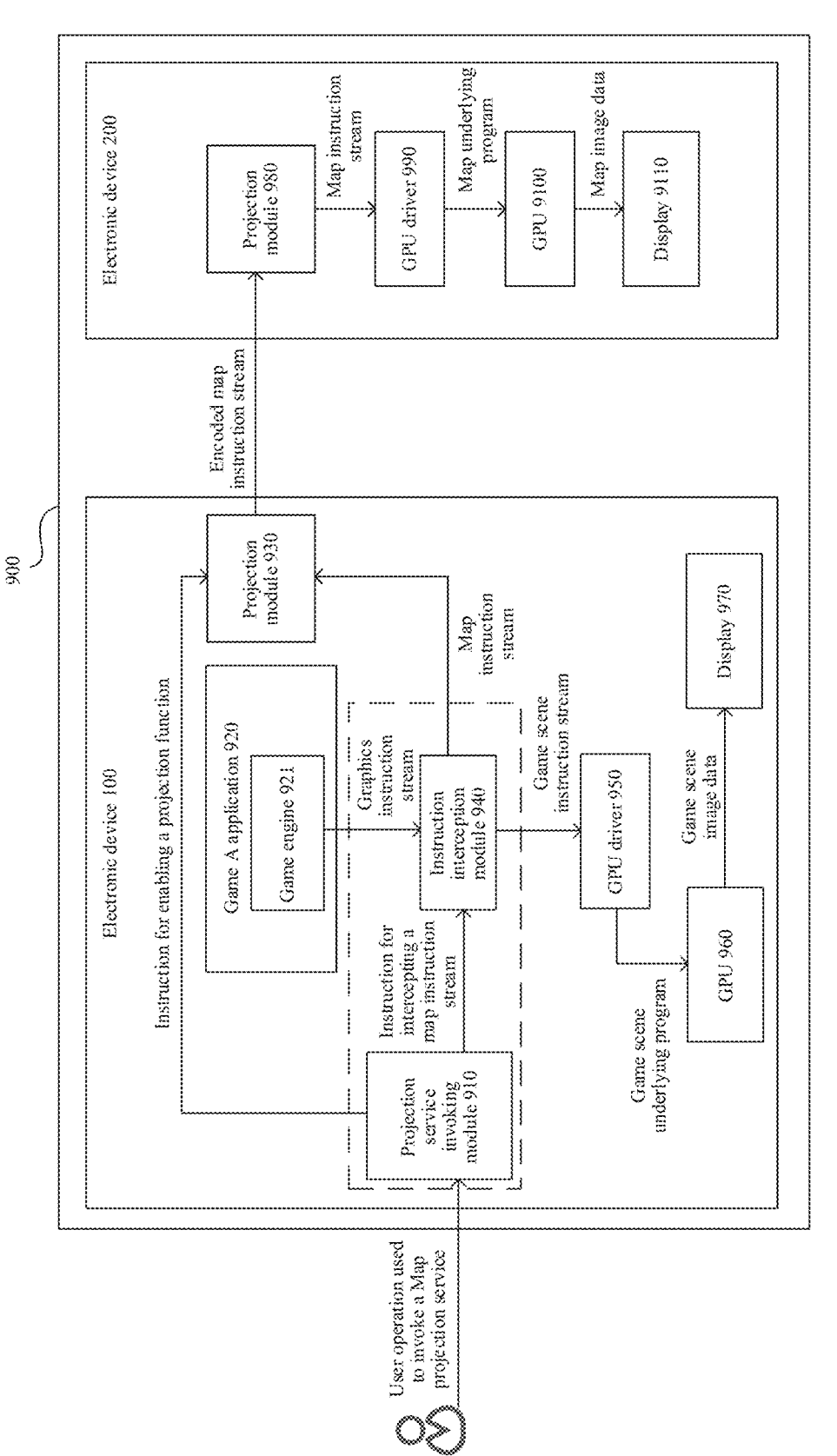
FIG. 10 is a schematic diagram of a structure of another projection system according to an embodiment of this application.

In a possible implementation, the target instruction library corresponding to the application may be obtained by obtaining a graphics instruction stream used to draw a user interface in the application and analyzing the graphics instruction stream. The graphics instruction stream of the user interface may include an instruction stream A used to draw first display content and an instruction stream B used to draw second display content. The first display content covers the second display content, and partially blocks the second display content. An analysis for the graphics instruction stream of the user interface may be a manual analysis. For example, the instruction stream A is determined based on a feature (for example, a length and a width of the second display content, or an element included in the second display content) of the second display content displayed on the user interface, and the instruction stream A is stored as the target instruction library. Optionally, an analysis for the graphics instruction stream of the user interface may be performed by a machine. The machine may determine the instruction stream A from the graphics instruction stream of the user interface based on an instruction stream filter rule stored in the machine. The instruction stream filter rule may be determined based on the feature of the second display content displayed on the user interface. A method for obtaining the target instruction library corresponding to the application is not limited in this embodiment of this application. FIG. 10 is a Schematic Diagram of an Example Structure of Another Projection System According to an Embodiment of this Application.

As shown in FIG. 10, the projection system 900 may include an electronic device 100 and an electronic device 200. The electronic device 100 may include a projection service invoking module 910, a Game A application 920, a projection module 930, an instruction interception module 940, a GPU driver 950, a GPU 960, and a display 970. The electronic device 200 may include a projection module 980, a GPU driver 990, a GPU 9100, and a display 9110.

Before a user operation used to invoke the Map projection service is received, the electronic device 100 may display a game interface on the display 970 by using the Game A application 920, the instruction interception module 940, the GPU driver 950, and the GPU 960. For details, refer to the descriptions of displaying the game interface on the display when the electronic device 100 does not receive the user operation used to invoke the Map projection service in embodiments. Details are not described herein again.

If the electronic device 100 receives the user operation used to invoke the Map projection service, the electronic device 100 and the electronic device 200 may respectively display, based on the projection system shown in FIG. 10, content in the game scene area 510A and content in the map area 510B that are shown in FIG. 6B.

Specifically, the electronic device 100 may run an application corresponding to the Game A application 920. The electronic device 100 may display the game interface on the display 970 by using the game engine 921, the instruction interception module 940, the GPU driver 950, and the GPU 960 according to the method in the foregoing embodiments. When the user operation used to invoke the Map projection service is detected, the projection service invoking module 910 may send, to the instruction interception module 940, the instruction for intercepting the map instruction stream, and send, to the projection module 930, an instruction for enabling a projection function. The user operation used to invoke the Map projection service may be, for example, a touch operation that is performed on the Map projection control 512E and that is shown in FIG. 6D.

Data that needs to be projected may be transmitted through a communication connection between the electronic device 100 and the electronic device 200. For a method for establishing the communication connection between the electronic device 100 and the electronic device 200, refer to the foregoing embodiments. Details are not described herein again.

When receiving the instruction for intercepting the map instruction stream, the instruction interception module 940 may intercept, by using the target instruction library, the map instruction stream from the graphics instruction stream used to draw the game interface. The graphics instruction stream used to draw the game interface is sent by the game engine 921. The graphics instruction stream may include the map instruction stream and a game scene instruction stream. A method for intercepting, by the instruction interception module 940, the map instruction stream may specifically be. The instruction interception module 940 obtains the target instruction library corresponding to the Game A application.

The target instruction library corresponding to the Game A application includes an instruction used to draw a map area (the map area 510B shown in FIG. 6B) on a user interface of the Game A. The instruction interception module 940 may determine, from the received graphics instruction stream, an instruction that matches the target instruction library, and perform an interception operation. In this way, the instruction interception module 940 may distinguish between the map instruction stream and the game scene instruction stream in the graphics instruction stream.

After intercepting the graphics instruction stream, the instruction interception module 940 may transmit the game scene instruction stream to the GPU driver 950, and transmit the map instruction stream to the projection module 930.

When receiving the game scene instruction stream, the GPU driver 950 may convert the instruction in the game scene instruction stream into a game scene underlying program, and drive the GPU 960 to execute the game scene underlying program. The game scene underlying program is a program (for example, machine code) that can be executed by the GPU 960. The GPU 960 may execute an instruction in the game scene underlying program to obtain game scene image data, and transmit the game scene image data to the display 970. The display 970 may display the content in the game scene area (the game scene area 510A shown in FIG. 6F).

When receiving the map instruction stream, the projection module 930 may encode the map instruction stream based on a protocol used between the electronic device 100 and the electronic device 200, and send an encoded map instruction stream to the electronic device 200.

The projection module 980 in the electronic device 200 may receive the encoded map instruction stream. The projection module 980 may decode the encoded map instruction stream based on the protocol used between the electronic device 100 and the electronic device 200, to obtain the map instruction stream. The projection module 980 may transmit the map instruction stream to the GPU driver YX. The GPU driver 990 may convert the instruction in the map instruction stream into a map underlying program, and drive the GPU 9100 to execute the map underlying program. The GPU 9100 may execute the map underlying program to obtain map image data. The GPU 9100 may transmit the map image data to the display 9110. The electronic device 200 may display a map image on the display 9110 (refer to the user interface 530 shown in FIG. 6F).

To be specific, the electronic device 100 may send, to the electronic device 200, the map instruction stream used to draw the content in the map area 510B. The electronic device 200 may run the map instruction stream, and draw the content in the map area 510B on the display.

In some embodiments, the electronic device 200 may obtain screen resolution of the electronic device 100. The electronic device 200 may zoom in or out a parameter in the received map instruction stream based on a ratio of the screen resolution of the electronic device 100 to screen resolution of the electronic device 200. In this way, a size of the map in the map area 510B may adapt to a size of a screen of the electronic device 200.

In some embodiments, the projection service invoking module 910 and the instruction interception module 940 both may be modules in the Application A in the foregoing embodiments. To be specific, the electronic device 100 in which the Application A is installed may implement, by using the projection service invoking module 910 and the instruction interception module 940, the display method provided in embodiments of this application.

It can be learned from the projection system 900 shown in FIG. 10 that the content in the game scene area 510A in the Game A application shown in FIG. 6B may be displayed on the electronic device 100. The content in the map area 510B in the Game A application may be projected onto the electronic device 200, and displayed by the electronic device 200. In this way, in a process of playing the Game A, the user can perform game control on the electronic device 100, and view the map on the electronic device 200. When the user performs game control on the electronic device 100, a field of view of the user is no longer blocked by the map area 510B, so that better game experience can be obtained.

In addition, the electronic device 100 may implement the display method by using the Application A. That is, an application that requires projection does not need to be modified. In this way, when a developer of a third-party application does not adaptively modify the application, the electronic device 100 may project, onto another device, a part of display content on a user interface of the third-party application. In this case, the display method provided in this application is applicable to a plurality of types of applications such as a game application, a live broadcast application, or a video call application.

In some embodiments, the target instruction library corresponding to the Game A application 920 further includes a map identification instruction stream. The map identification instruction stream may be used to draw content in the map identification area 610B shown in FIG. 7A. For example, the content in the map identification area 610B may be a layer having a solid color and specific transparency. For the map identification area 610B, refer to the descriptions in the foregoing embodiments. Details are not described herein again. The map identification instruction stream may be determined based on the map instruction stream. For example, an instruction and a parameter that are in the map identification instruction stream and that correspond to a size of the map identification area 610B and a location of the map identification area 610B in the game interface 610 are the same as an instruction and a parameter that are in the map identification instruction stream and that correspond to a size of the map area 510B and a location of the map area 510B in the game interface 510. The instruction interception module 940 may obtain the map identification instruction stream from the target instruction library, and combine the map identification instruction stream with the game scene instruction stream. The map identification instruction stream may replace the map instruction stream in the graphics instruction stream used to draw the game interface 510, to implement combination of the map identification instruction stream and the game scene instruction stream.

The instruction interception module 940 may transmit the combined map identification instruction stream and game scene instruction stream to the GPU driver 950. The electronic device 100 may display, based on the game scene instruction stream and the map identification instruction stream, the game interface 610 shown in FIG. 7A.

When the Game A application 920 receives the user operation performed on the map identification area 610B shown in FIG. 7A (in other words, the map area 510B before projection is displayed in FIG. 6B), the map that may be displayed in the map area 510B is adjusted in response to the user operation. The game engine 921 may obtain a parameter (for example, a feature of an element in the map) after the map is adjusted, and invoke the 3D graphics processing library to obtain the graphics instruction stream. The graphics instruction stream includes an instruction stream used to draw an adjusted map. The game engine 921 may assign a value to a parameter in an instruction when invoking the 3D graphics processing library. The parameter in the instruction may include the parameter after map adjustment.

Further, the instruction interception module 940 may intercept the map instruction stream from the graphics instruction stream. The map instruction stream may be used to draw the map that is adjusted in response to the user operation. The electronic device 100 transmits projected data (namely, the map instruction stream) to the electronic device 200. The electronic device 200 may display the adjusted map.

In some other embodiments, when invoking the Map projection service, the electronic device 100 may perform rendering on a local display based on an instruction stream remained after instruction stream interception operation, to display the content in the game scene area 510A shown in FIG. 6F. When detecting the user operation performed on the originally displayed map area 510B, the electronic device 100 may still make a corresponding response. A result of the response may be presented on the user interface of the electronic device 200.

It can be learned from the foregoing embodiments that, after the Map projection service is invoked, the user operation performed on the originally displayed map area 510B is still valid. For example, the user may slide in the map identification area 610B in various directions to adjust the map displayed on the user interface 620, so that different areas in the map are viewed. In addition, because the content displayed in the map identification area 610B may be the layer having the solid color and specific transparency (or a border of a same size as the map area 510B), the map identification area 610B does not completely block the part that is of the game scene area 610A and that is covered by the map identification area 610B. Compared with the game interface 510 before projection, a game interface after projection enables the user to view content in a larger field of view when performing game control on the electronic device 100, so that better game experience can be obtained.

Figure 11:
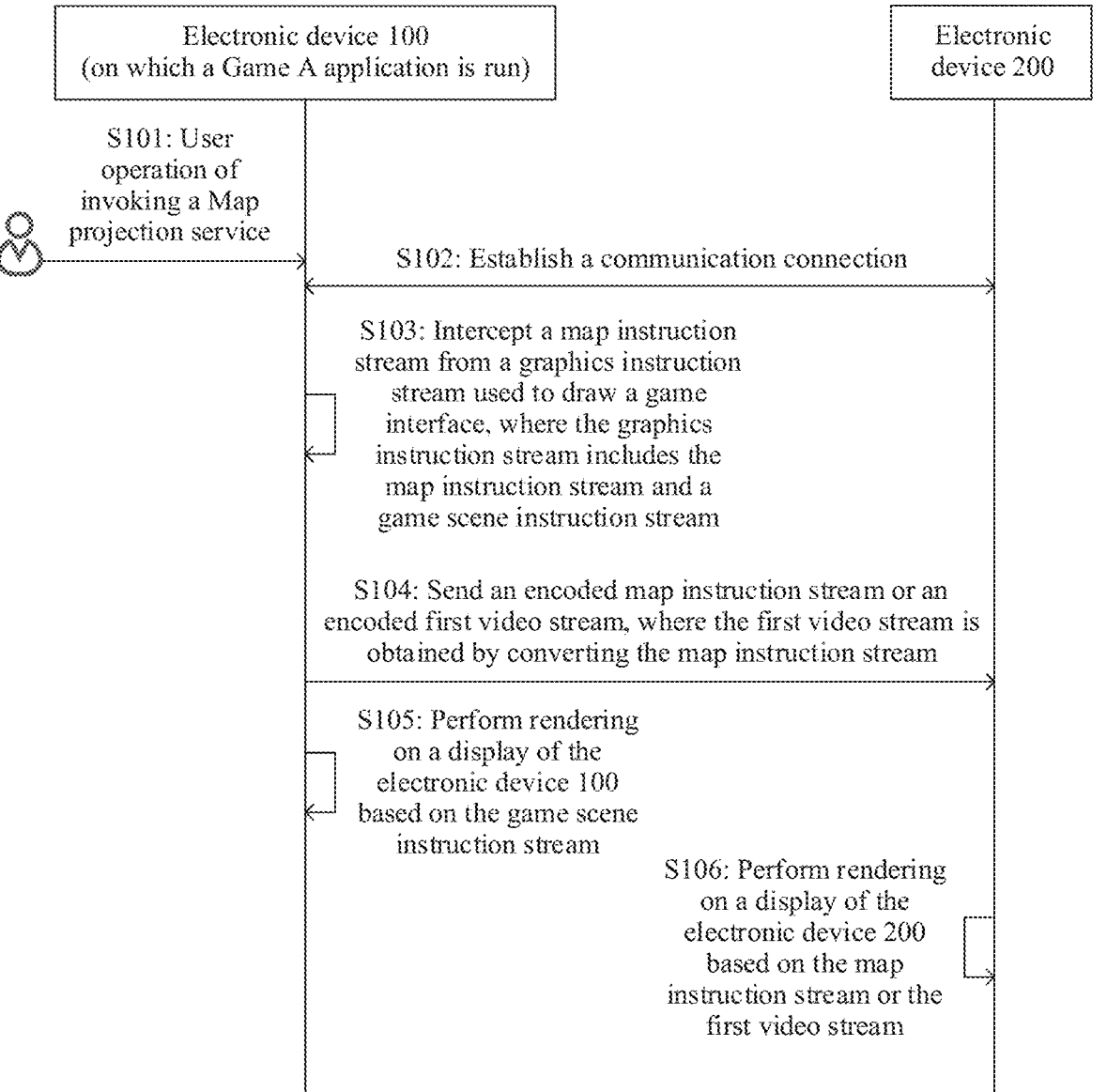
FIG. 11 is a flowchart of a display method according to an embodiment of this application.

FIG. 11 Shows an Example of a Display Method According to an Embodiment of this Application.

As shown in FIG. 11, the method includes the following steps S101 to S106.

S101: An electronic device 100 may detect a user operation used to invoke a Map projection service.

The electronic device 100 may be running a Game A application, and display a game interface of the Game A application on a display. For the game interface, refer to the game interface 510 shown in FIG. 6B.

The Map projection service may be provided by the Application A in the foregoing embodiments. According to the method shown in FIG. 5A to FIG. 5D, the Application A may be associated with the Game A application. In this way, the Application A may provide the Map projection service for the Game A application.

The user operation used to invoke the Map projection service may be, for example, a touch operation that is performed on the Map projection control 512E and that is shown in FIG. 6D.

S102: The electronic device 100 may establish a communication connection to an electronic device 200.

When detecting the user operation used to invoke the Map projection service, the electronic device 100 may request to establish the communication connection to the electronic device 200. The electronic device 100 and the electronic device 200 may be two devices in a same local area network (such as same home Wi-Fi). A method for establishing the communication connection between the electronic device 100 and the electronic device 200 is not specifically limited in this embodiment of this application.

In some embodiments, the communication connection between the electronic device 100 and the electronic device 200 may alternatively be established before the electronic device 100 detects the user operation used to invoke the Map projection service.

S103: The electronic device 100 may intercept a map instruction stream from a graphics instruction stream used to draw the game interface, where the graphics instruction stream may include the map instruction stream and a game scene instruction stream.

The map instruction stream may be used to draw content in the map area 510B shown in FIG. 6B. The game scene instruction stream may be used to draw content in the game scene area 510A shown in FIG. 6B.

For an implementation of intercepting, by the electronic device 100, the map instruction stream from the graphics instruction stream, refer to the foregoing embodiments. Details are not described herein again.

S104: The electronic device 100 may send an encoded map instruction stream or an encoded first video stream to the electronic device 200, where the first video stream is obtained by converting the map instruction stream.

For a method for sending, by the electronic device 100, the encoded map instruction stream to the electronic device 200, refer to the embodiment shown in FIG. 10. For a method for sending, by the electronic device 100, the encoded first video stream to the electronic device 200, refer to the embodiment shown in FIG. 9.

S105: The electronic device 100 may perform rendering on the display of the electronic device 100 based on the game scene instruction stream.

The electronic device 100 may display, on the display based on the game scene instruction stream, content in the game scene area 510A shown in FIG. 6F.

In some embodiments, the electronic device 100 may further obtain a map identification instruction stream. The map identification instruction stream may be used to draw content in the map identification area 610B shown in FIG. 7A. The map identification area 610B may be used to identify a location of the map area 510B shown in FIG. 6A before projection. The map identification area 610B may cover the game scene area 610B. A size of the map identification area 610B and a location of the map identification area 610B on the game interface 610 may be the same as a size of the map area 510B and a location of the map identification area 510B on the game interface 510 in FIG. 6A. The content in the map identification area 610B may be a layer that has a solid color and specific transparency and that is shown in FIG. 7A. The layer having the solid color and the specific transparency does not completely block a part that is of the game scene area 610A and that is covered by the map identification area 610B.

The electronic device 100 may display, based on the game scene instruction stream and the map identification instruction stream, the game interface 610 shown in FIG. 7A. The game interface 610 may include the game scene area 610A and the map identification area 610B.

S106: The electronic device 200 may perform rendering on a display of the electronic device 200 based on the map instruction stream or the first video stream.

The electronic device 200 may display, based on the map instruction stream or the first video stream, a map on the user interface 530 shown in FIG. 6F.

The application in the display method is not limited in embodiments of this application. In addition to the Game A application, the electronic device 100 may further project, onto another electronic device for display, a part of display content on a user interface of a type of application like a live broadcast application or a video call application.

It can be learned from the display method shown in FIG. 11 that the content in the game scene area 510A in the Game A application may be displayed on the electronic device 100. The content in the map area 510B in the Game A application may be projected onto the electronic device 200, and displayed by the electronic device 200. In this way, in a process of playing the Game A, the user can perform game control on the electronic device 100, and view the map on the electronic device 200. When the user performs game control on the electronic device 100, a field of view of the user is no longer blocked by the map area 510B, so that better game experience can be obtained.

In addition, the electronic device 100 may implement the display method by using the Application A. That is, an application that requires projection does not need to be modified. In this way, when a developer of a third-party application does not adaptively modify the application, the electronic device 100 may project, onto another device, a part of display content on a user interface of the third-party application. In this case, the display method provided in this application is applicable to a plurality of types of applications such as a game application, a live broadcast application, or a video call application.

In some embodiments, display content is not limited to two parts of display content. The user interface of the application may include three parts of display content or more display content. An example in which the user interface includes three parts of display content (first display content, second display content, and third display content) is used for description. The electronic device 100 may respectively project the first display content and the third display content onto the electronic device 200 and the electronic device 300, and display only the second display content locally.

Specifically, the electronic device 100 may store a target instruction library A corresponding to the first display content and a target instruction library B corresponding to the third display content. For a method for obtaining the target instruction library by the electronic device 100, refer to the descriptions in the foregoing embodiments. The electronic device 100 may intercept, based on the target instruction library A from a graphics instruction stream used to draw the user interface, an instruction stream used to draw the first display content. The electronic device 100 may intercept, based on the target instruction library B from the graphics instruction stream used to draw the user interface, an instruction stream used to draw the third display content.

The electronic device 100 may send, to the electronic device 200, the instruction stream used to draw the first display content. Alternatively, the electronic device 100 may first perform rendering in a background by using the instruction stream used to draw the first display content, to obtain an image including the first display content. Then, the electronic device 100 may convert the image including the first display content into a video stream, and send the video stream to the electronic device 200. In this way, the electronic device 200 may display the first display content.

The electronic device 100 may send, to the electronic device 300, the instruction stream used to draw the third display content. Alternatively, the electronic device 100 may first perform rendering in the background by using the instruction stream used to draw the third display content, to obtain an image including the third display content. Then, the electronic device 100 may convert the image including the third display content into a video stream, and send the video stream to the electronic device 300. In this way, the electronic device 300 may display the third display content.

After the operations of intercepting the instruction streams are performed, a remaining instruction stream in the graphics instruction stream used to draw the user interface may include an instruction stream used to draw the second display content. The electronic device 100 may display the second display content based on the instruction stream used to draw the second display content. For specific implementations in which the electronic device 100, the electronic device 200, and the electronic device 300 perform image rendering on the display based on the instruction streams, refer to implementations in the conventional technology. This is not limited in embodiments of this application.

In this embodiment of this application, a first electronic device may run a first application, and display a first user interface. The first user interface may include first content and second content. The first application may be an application like a game application in the foregoing embodiments, a live broadcast application, or a video call application. The first user interface may be, for example, the game interface 210 shown in FIG. 1. The first content may be the second display content in the foregoing embodiment (the content in the map area 210B shown in FIG. 1). The second content may be the first display content in the foregoing embodiment (the content in the game scene area 210A shown in FIG. 1).

In this application, the first electronic device may display a second user interface in response to a first operation. The second user interface may include the first content. The second user interface may be, for example, the user interface of the electronic device 100 shown in FIG. 6F. The first operation may be, for example, the user operation performed on the Map projection control 512E shown in FIG. 6D.

In this application, the first electronic device may send first data to a second electronic device, where the first data may enable the second electronic device to display a third user interface. The third user interface may be, for example, the user interface of the electronic device 200 shown in FIG. 6F.

In this application, the second user interface may further include third content. The third content is displayed on a part of the first content. The third content may have transparency. The second user interface including the third content may be, for example, the game interface 610 shown in FIG. 7A. The third content may be the content in the map identification area 610B shown in FIG. 7A.

In conclusion, the foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions in embodiments of this application.

What is claimed is:

1. A method, applied to a first electronic device, comprising:

running a first application, and displaying a first user interface, wherein the first user interface comprises first content and second content, the second content overlaps with a part of the first content, and the first user interface is related to the first application;

in response to a first operation, generating a second instruction stream and a third instruction stream based on a first instruction stream, wherein the first instruction stream is related to the first application;

displaying a second user interface based on the second instruction stream, wherein the second user interface comprises the first content, and the part that is of the first content and that is covered by the second content is presented on the second user interface;

determining first data based on the third instruction stream; and sending the first data to a second electronic device, wherein the first data enables the second electronic device to display a third user interface, the third user interface comprises the second content, and the first electronic device is communicatively connected to the second electronic device.

2. The method according to claim 1, wherein the second user interface further comprises third content, the third content is displayed on the part of the first content, and the third content has transparency.

3. The method according to claim 2, wherein a size and a location of a display area of the third content are respectively the same as a size and a location of a display area of the second content.

4. The method according to claim 2, wherein the displaying a second user interface comprises:

generating a fourth instruction stream based on the third instruction stream;

generating a fifth instruction stream based on the second instruction stream and the fourth instruction stream; and displaying the second user interface based on the fifth instruction stream, wherein the second user interface comprises the first content and the third content.

5. The method according to claim 1, wherein the first data is the third instruction stream, or the first data is a first video stream, the first video stream is obtained based on image data comprising the second content, and the image data comprising the second content is obtained based on the third instruction stream.

6. The method according to claim 1, wherein the method further comprises:

receiving a second operation performed on a first area of the second user interface, wherein the first area is an area in which the part that is of the first content and that is covered by the second content is presented on the second user interface; and executing an instruction in response to the second operation.

7. The method according to claim 1, wherein the first electronic device stores a target instruction library, and the generating the second instruction stream and the third instruction stream based on the first instruction stream comprises: determining, from the first instruction stream, an instruction that matches an instruction in the target instruction library, and performing an interception operation.

8. An electronic device, wherein the electronic device comprises a display, a communication module, at least one memory, and at least one processor, the at least one memory is coupled to the at least one processor and stores programming instructions for execution by the at least one processor to cause the electronic device to perform operations comprising:

running a first application, and displaying a first user interface, wherein the first user interface comprises first content and second content, the second content overlaps with a part of the first content, and the first user interface is related to the first application;

in response to a first operation, generating a second instruction stream and a third instruction stream based on a first instruction stream, wherein the first instruction stream is related to the first application;

displaying a second user interface based on the second instruction stream, wherein the second user interface comprises the first content, and the part that is of the first content and that is covered by the second content is presented on the second user interface;

determining first data based on the third instruction stream; and sending the first data to a second electronic device, wherein the first data enables the second electronic device to display a third user interface, the third user interface comprises the second content, and the electronic device is communicatively connected to the second electronic device.

9. The electronic device according to claim 8, wherein the second user interface further comprises third content, the third content is displayed on the part of the first content, and the third content has transparency.

10. The electronic device according to claim 9, wherein a size and a location of a display area of the third content are respectively the same as a size and a location of a display area of the second content.

11. The electronic device according to claim 9, wherein the displaying a second user interface comprises:

generating a fourth instruction stream based on the third instruction stream;

generating a fifth instruction stream based on the second instruction stream and the fourth instruction stream; and displaying the second user interface based on the fifth instruction stream, wherein the second user interface comprises the first content and the third content.

12. The electronic device according to claim 8, wherein the first data is the third instruction stream, or the first data is a first video stream, the first video stream is obtained based on image data comprising the second content, and the image data comprising the second content is obtained based on the third instruction stream.

13. The electronic device according to claim 8, wherein the operations further comprise:

receiving a second operation performed on a first area of the second user interface, wherein the first area is an area in which the part that is of the first content and that is covered by the second content is presented on the second user interface; and executing an instruction in response to the second operation.

14. The electronic device according to claim 8, wherein the electronic device stores a target instruction library, and the generating the second instruction stream and the third instruction stream based on the first instruction stream comprises: determining, from the first instruction stream, an instruction that matches an instruction in the target instruction library, and performing an interception operation.

15. An electronic device, wherein the electronic device comprises a display, a communication module, at least one memory, and at least one processor, the at least one memory is coupled to the at least one processor and stores programming instructions for execution by the at least one processor to cause the electronic device to perform operations comprising:

running a first application, and displaying a first user interface, wherein the first user interface comprises first content and second content, the second content overlaps with a part of the first content, and the first user interface is related to the first application;

in response to a first operation, generating a second instruction stream and a third instruction stream based on a first instruction stream, wherein the first instruction stream is related to the first application;

displaying a second user interface based on the second instruction stream, wherein the second user interface comprises the first content; and extracting second data from first data, and sending second data to a second electronic device, wherein the first data corresponds to the first content and the second content, and the second data corresponds to the second content.

16. The electronic device according to claim 15, wherein the second user interface further comprises third content, the third content is displayed on the part of the first content, and the third content has transparency.

17. The electronic device according to claim 16, wherein a size and a location of a display area of the third content are respectively the same as a size and a location of a display area of the second content.

18. The electronic device according to claim 16, wherein the displaying a second user interface comprises:

generating a fourth instruction stream based on the third instruction stream;

generating a fifth instruction stream based on the second instruction stream and the fourth instruction stream; and displaying the second user interface based on the fifth instruction stream, wherein the second user interface comprises the first content and the third content.

19. The electronic device according to claim 15, wherein the operations further comprise:

receiving a second operation performed on a first area of the second user interface, wherein the first area is an area in which the part that is of the first content and that is covered by the second content is presented on the second user interface; and executing an instruction in response to the second operation.

20. The electronic device according to claim 15, wherein the electronic device stores a target instruction library, and the generating the second instruction stream and the third instruction stream based on the first instruction stream comprises: determining, from the first instruction stream, an instruction that matches an instruction in the target instruction library, and performing an interception operation.

* * * * *